United States Patent
Hayashi

(10) Patent No.: US 7,766,131 B2
(45) Date of Patent: Aug. 3, 2010

(54) DISK BRAKE

(75) Inventor: Shigeru Hayashi, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 11/392,670

(22) Filed: Mar. 30, 2006

(65) Prior Publication Data
US 2006/0260884 A1 Nov. 23, 2006

(30) Foreign Application Priority Data
Apr. 28, 2005 (JP) .............................. 2005-132420

(51) Int. Cl.
F16D 65/38 (2006.01)
F16D 65/00 (2006.01)

(52) U.S. Cl. ................. 188/73.37; 188/73.38

(58) Field of Classification Search ............. 188/73.36, 188/73.37, 73.38, 73.31; 267/158
See application file for complete search history.

(56) References Cited

U.S. PATENT DOCUMENTS

| 4,245,723 A | * | 1/1981 | Moriya | ..................... 188/72.3 |
| 5,125,482 A | * | 6/1992 | Negishi | .................... 188/73.38 |
| 5,381,875 A | * | 1/1995 | Tsuruta et al. | ........... 188/73.38 |
| 5,699,882 A | * | 12/1997 | Ikegami et al. | ........... 188/73.38 |
| 6,269,915 B1 | * | 8/2001 | Aoyagi | .................... 188/73.38 |
| 7,201,257 B2 | * | 4/2007 | Nakajima et al. | ........ 188/73.38 |
| 2007/0251772 A1 | * | 11/2007 | Tsurumi | .................. 188/73.38 |

FOREIGN PATENT DOCUMENTS

| GB | 2006357 A | * | 5/1979 |
| JP | 5-89978 | | 12/1993 |

* cited by examiner

Primary Examiner—Melody M Burch
(74) Attorney, Agent, or Firm—Wenderoth, Lind & Ponack, L.L.P.

(57) ABSTRACT

A pad spring located at the entrance side in the rotational direction of a disk is provided with guide plate portions, radially urging portions that urge a pair of friction pads radially outward of the disk, and circumferentially urging portions that urge the friction pads in the rotational direction of the disk. Each radially urging portion has a projection bent radially inward of the disk. Each guide plate portion has a space portion that allows the projection to abut against the radially inner wall surface of the associated pad guide when the radially urging portion is displaced radially inward of the disk so as to approach the guide plate portion. The circumferentially urging portions are wide plate-shaped members bent from the guide plate portions.

15 Claims, 15 Drawing Sheets

DISK BRAKE

BACKGROUND OF THE INVENTION

The present invention relates to a disk brake suitably used to apply braking force to a vehicle, for example, an automobile.

In general, a disk brake provided on a vehicle, e.g. an automobile, includes a mounting member secured to a non-rotating part of a vehicle. The mounting member has a pair of arms spaced apart from each other in the rotational direction of a disk. The pair of arms extend over the outer periphery of the disk in the axial direction of the disk. A caliper is slidably provided on the arms of the mounting member to press a pair of friction pads against both sides of the disk. A pair of pad springs are attached to the respective arms of the mounting member to resiliently support the pair of friction pads between the arms [for example, see Japanese Utility Model Application Public Disclosure (KOKAI) No. Hei 5-89978].

This type of conventional disk brake operates as follows. When the driver of the vehicle conducts a braking operation, a piston provided on the inner side of the caliper is forced to slide toward the disk by an externally supplied hydraulic pressure, causing the inner friction pad to be pressed against the disk. Counterforce produced at this time causes the caliper to be slidingly displaced relative to the mounting member. Consequently, the friction pads are pressed against both sides of the disk between the outer claw portion of the caliper and the piston, thereby applying braking force to the rotating disk.

The arms of the mounting member are provided with pad guides for slidably guiding the pair of friction pads in the axial direction of the disk. The pad springs suppress rattling of the friction pads against the pad guides of the arms or the like and allow smooth sliding displacement of the friction pads.

The pad springs are formed, for example, by pressing resilient metal plates or the like. Of the pair of pad springs, the one that is located at the entrance side in the rotational direction of the disk (this side will hereinafter be referred to as "entrance side") is provided with pad-urging spring members extending obliquely to the axial direction of the disk. The pad-urging spring members are each formed by folding the proximal end portion of an elongated plate-shaped spring member in a substantially U shape. The pad-urging spring members urge the respective friction pads in the rotational (circumferential) direction of the disk.

The pad spring that is located at the exit side in the rotational direction of the disk (this side will hereinafter be referred to as "exit side") is provided with pad-retaining plate portions that bear braking torque acting on the friction pads in cooperation with the exit-side arm. The pad-retaining plate portions suppress the friction pads from being displaced relative to the mounting member in the rotational (circumferential) direction of the disk.

In the above-described prior art, the entrance-side pad spring is provided with pad-urging spring members to suppress rattling of the friction pads in the rotational direction of the disk. Each pad-urging spring member is, however, formed by folding the proximal end portion of an elongated plate-shaped spring member in a substantially U shape. The distal end portion of the pad-urging spring member extends obliquely to the axial direction of the disk.

Accordingly, the pad spring of the prior art suffers from the following problem. The pad-urging spring members are each formed as an elongated plate-shaped spring member extending obliquely to the axial direction of the disk. Therefore, urging force (spring load of the pad-urging spring members) that urges the friction pads in the rotational (circumferential) direction of the disk differs considerably when the friction pads are new and when they have become worn. Therefore, it is difficult to keep the urging force constant.

In addition, each pad-urging spring member has a substantially U-shaped folded portion at the proximal end thereof. The folded portion undesirably extends to a considerable extent axially outward of the disk from the pad guide of the mounting member. Therefore, the folded portions of the pad-urging spring members are likely to interfere with the assembling operation when the pad springs are attached to the mounting member and the friction pads are fitted to the pad springs. If external force is applied to the folded portion of any pad-urging spring member by accidental touch during the assembling operation, the overall urging force of the pad-urging spring member may be varied unfavorably.

Moreover, because the pad-urging spring members are elongated plate-shaped spring members extending obliquely to the axial direction of the disk, the urging direction for the friction pads is undesirably tilted at an angle to the plane of the disk, causing the friction pads to tilt with respect to the disk. The unstable attitude of the friction pads causes deterioration of the sliding properties of the friction pads.

SUMMARY OF THE INVENTION

The present invention was made in view of the above-described problems with the prior art.

An object of the present invention is to provide a disk brake capable of stabilizing the attitude of the friction pads with respect to the disk, thereby suppressing occurrence of rattling and the like, and thus making it possible to prevent vibration of the friction pads and generation of brake noise or the like.

The present invention is applied to a disk brake including a mounting member having a pair of arms spaced apart from each other in the rotational direction of a disk. The arms extend over the outer periphery of the disk in the axial direction of the disk. The arms are provided with pad guides. A caliper is slidably provided on the arms of the mounting member. A pair of friction pads are slidably fitted to the arms of the mounting member through the pad guides. The friction pads are pressed against both sides of the disk by the caliper. A pair of pad springs are attached to the respective arms of the mounting member to resiliently support the friction pads between the arms.

The feature of a first structure adopted by the present invention is as follows. One of the pair of pad springs has guide plate portions fitted to the pad guides of the mounting member to guide the friction pads axially of the disk in cooperation with the pad guides. The pad spring further has radially urging portions extending axially of the disk between the guide plate portions and the friction pads to urge the friction pads radially outward of the disk, and circumferentially urging portions formed as wide plate-shaped members bent from the guide plate portions obliquely radially inward of the disk to urge the friction pads in the rotational direction of the disk.

According to one embodiment of the present invention, the above-described pad spring further has claw portions that are fitted to the pad guides of the mounting member, together with the guide plate portions. The claw portions urge the guide plate portions relative to the pad guides radially outward of the disk by resiliently contacting the radially inner wall surfaces of the pad guides as viewed in the radial direction of the disk.

According to another embodiment of the present invention, the radially urging portions have projections provided at respective longitudinally intermediate portions thereof. The projections are bent radially inward of the disk. The guide plate portions have space portions that allow the projections to abut against the wall surfaces of the pad guides when the radially urging portions are displaced radially inward of the disk so as to approach the guide plate portions.

According to another embodiment of the present invention, the radially urging portions are formed as elongated plate-shaped members whose proximal ends are folded radially outward of the disk in a substantially U shape and whose distal ends are free ends extending axially of the disk between the guide plate portions and the friction pads. Cuts are formed between the radially urging portions and the guide plate portions, respectively, to allow the circumferentially urging portions and the radially urging portions to be elastically deformed independently of each other.

According to another embodiment of the present invention, the one of the pair of pad springs is an entrance-side pad spring attached to one of the arms of the mounting member that is located at the entrance side in the rotational direction of the disk.

The feature of a second structure adopted by the present invention is as follows. One of the pair of pad spring has guide plate portions fitted to the pad guides of the mounting member to guide the friction pads axially of the disk in cooperation with the pad guides. The pad spring further has radially urging portions extending axially of the disk between the guide plate portions and the friction pads to urge the friction pads radially outward of the disk.

The above-described pad spring further has claw portions that are fitted to the pad guides of the mounting member, together with the guide plate portions. The claw portions urge the guide plate portions relative to the pad guides radially outward of the disk by resiliently contacting the radially inner wall surfaces of the pad guides as viewed in the radial direction of the disk.

The radially urging portions have projections provided at respective longitudinally intermediate portions thereof. The projections are bent radially inward of the disk. The guide plate portions have space portions that allow the projections to abut against the wall surfaces of the pad guides when the radially urging portions are displaced radially inward of the disk so as to approach the guide plate portions.

According to one embodiment of the second structure of the present invention, the radially urging portions are formed as elongated plate-shaped members whose proximal ends are folded radially outward of the disk in a substantially U shape and whose distal ends are free ends extending axially of the disk between the guide plate portions and the friction pads. Cuts are formed between the radially urging portions and the guide plate portions, respectively, to allow the circumferentially urging portions and the radially urging portions to be elastically deformed independently of each other.

According to the first structure of the present invention, one of the pair of pad springs is provided with guide plate portions, radially urging portions, and circumferentially urging portions. The circumferentially urging portions are formed as wide plate-shaped members bent from the guide plate portions obliquely radially inward of the disk to urge the friction pads in the rotational direction of the disk. Therefore, the urging force (spring load) of the circumferentially urging portions can be set substantially constant irrespective of whether the friction pads are new or have become worn in comparison to the prior art. Accordingly, the friction pads can continue to be stably urged in the rotational direction of the disk (e.g. toward the exit side in the rotational direction). In addition, because the circumferentially urging portions are bent from the guide plate portions obliquely radially inward of the disk, the circumferentially urging portions will not interfere with the assembling operation when the pad springs are attached to the mounting member. Accordingly, the assembling operation efficiency can be improved.

Moreover, the circumferentially urging portions allow the urging direction for the friction pads to be oriented substantially parallel to the plane of the disk. Hence, the friction pads can be prevented from tilting with respect to the disk. Accordingly, by urging the friction pads in the rotational direction of the disk with the circumferentially urging portions, the attitude of the friction pads with respect to the disk can be stabilized, and the sliding characteristics and so forth of the friction pads can be maintained favorably. Further, the radially urging portions and circumferentially urging portions provided on the pad springs can suppress rattling of the friction pads in the radial and rotational (circumferential) directions of the disk. Accordingly, it is possible to suppress vibration of the friction pads favorably and to prevent occurrence of brake noise or the like.

With the arrangement in which the pad spring is provided with claw portions that are fitted to the pad guides of the mounting member, together with the guide plate portions, the guide plate portions of the pad spring can be urged relative to the pad guides radially outward of the disk by bringing the claw portions into resilient contact with the wall surfaces of the pad guides. By so doing, the circumferentially urging portions can be separated from the pad guides, and the urging force of the circumferentially urging portions can be stabilized.

With the arrangement in which the radially urging portions of the pad spring are provided with projections, and the guide plate portions are provided with space portions, when the radially urging portions extending axially of the disk between the guide plate portions and the friction pads are displaced in a direction opposite to the urging direction (direction in which the friction pads are urged radially outward of the disk) owing to vibration or the like during a braking operation, for example, the projections abut against the wall surfaces of the pad guides to bear external force or the like due to vibration. Hence, it is possible to prevent excessive stress from being applied to the radially urging portions and so forth. Accordingly, the projections can prevent the radially urging portions from being deformed so as to overlie the guide plate portions strongly when vibration occurs as stated above. Thus, it is possible to suppress stress concentration on the radially urging portions and the guide plate portions and also possible to increase the overall durability, service life and so forth of the pad spring and to improve reliability.

With the arrangement in which cuts are formed between the radially urging portions and the guide plate portions, the circumferentially urging portions and the radially urging portions are allowed to be elastically deformed independently of each other. Accordingly, the deformation of the radially urging portions, for example, can be prevented from affecting the circumferentially urging portions. Consequently, it is possible to prevent excessive stress from being applied to the radially urging portions and the circumferentially urging portions and to suppress the occurrence of stress concentration and so forth. Moreover, because the respective urging forces of the radially and circumferentially urging portions applied to the friction pads are independent of each other, the pad attitude and the attitude of the pad springs can be stabilized.

According to the second structure of the present invention, the pad spring is provided with claw portions that are fitted to the pad guides of the mounting member, together with the guide plate portions. Therefore, the guide plate portions of the pad spring can be urged relative to the pad guides radially outward of the disk by bringing the claw portions into resilient contact with the wall surfaces of the pad guides. Thus, the guide plate portions can be stably attached to the pad guides. In addition, the radially urging portions of the pad spring are provided with projections, and the guide plate portions are provided with space portions. Therefore, when the radially urging portions extending axially of the disk between the guide plate portions and the friction pads are displaced in a direction opposite to the urging direction (direction in which the friction pads are urged radially outward of the disk) owing to vibration or the like during a braking operation, for example, the projections abut against the wall surfaces of the pad guides to bear external force or the like due to vibration. Hence, it is possible to prevent excessive stress from being applied to the radially urging portions and so forth. Accordingly, the projections can prevent the radially urging portions from being deformed so as to overlie the guide plate portions strongly when vibration occurs as stated above. Thus, it is possible to suppress stress concentration on the radially urging portions and the guide plate portions and also possible to increase the overall durability, service life and so forth of the pad spring and to improve reliability.

The above and other objects, features and advantages of the present invention will become more apparent from the following description of the preferred embodiments thereof, taken in conjunction with the accompanying drawings.

DETAILED DESCRIPTION OF THE INVENTION

A disk brake according to an embodiment of the present invention will be explained below in detail with reference to the accompanying drawings.

FIGS. 1 to 17 show a first embodiment of the present invention. In the figures, a disk 1 rotates together with a wheel (not shown) of a vehicle. For example, when the vehicle runs in the forward direction, the disk 1 rotates in the direction of the arrow A in FIG. 1.

Figure 1:
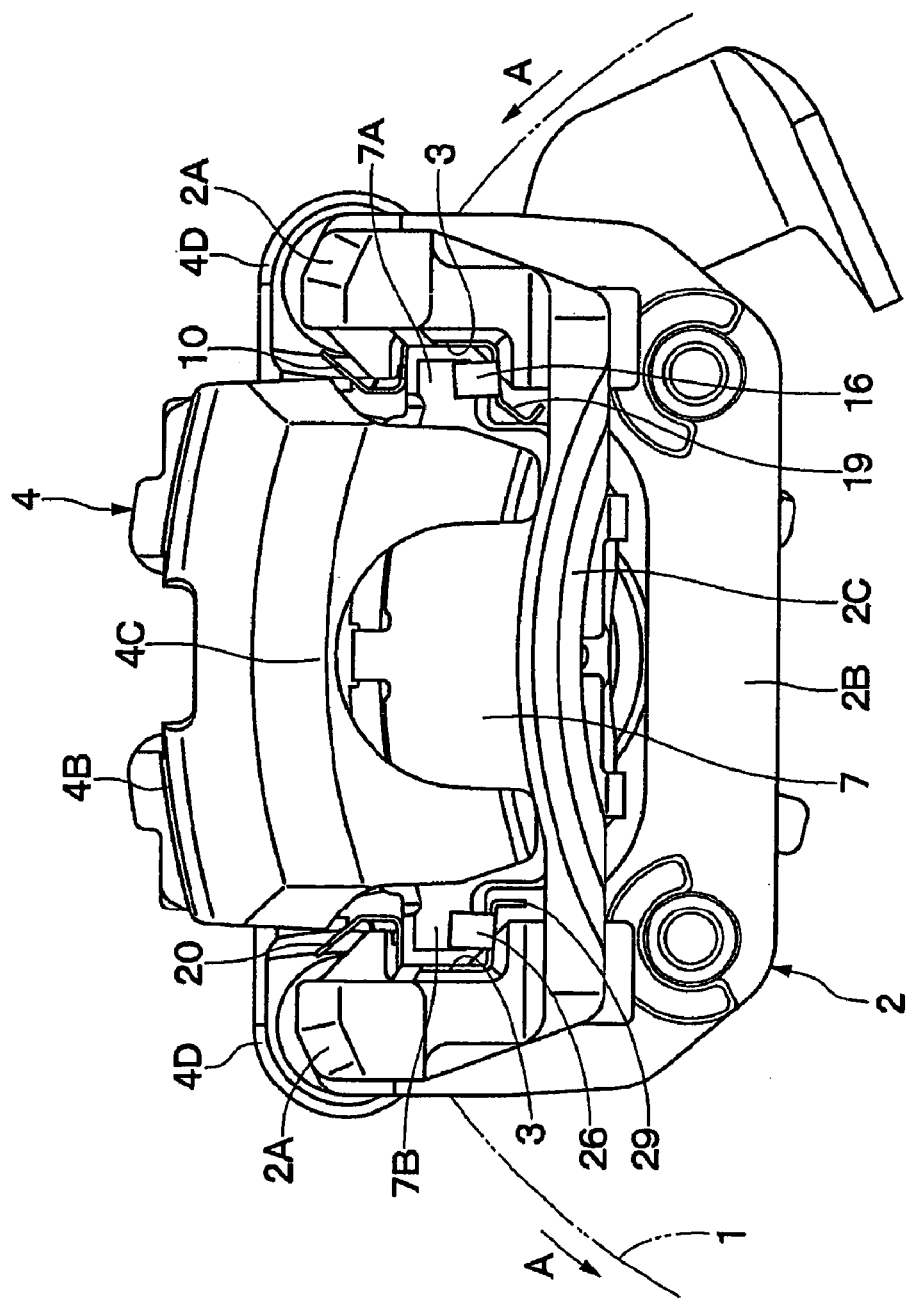
FIG. 1 is a front view of a disk brake according to an embodiment of the present invention.
Figure 2:
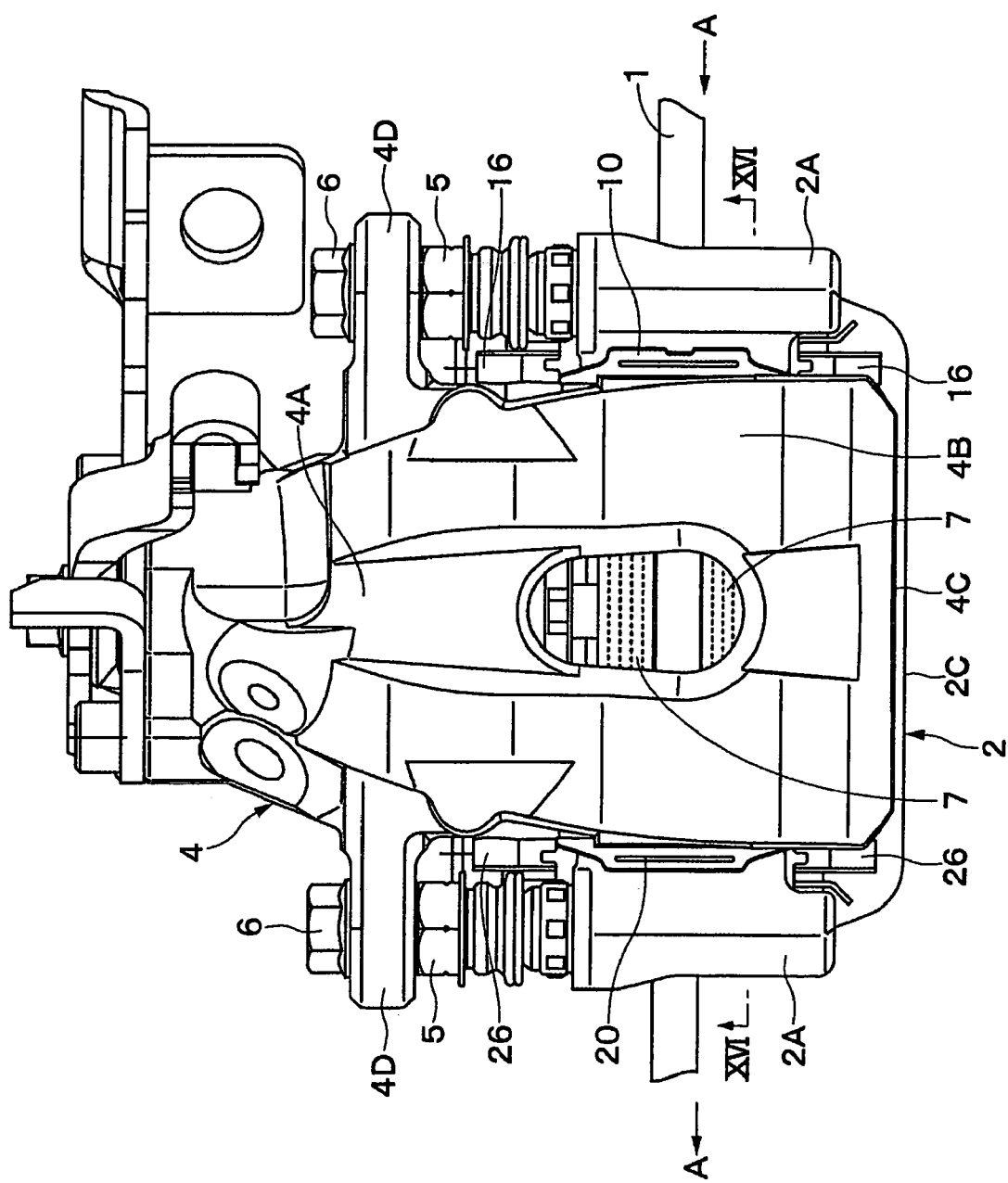
FIG. 2 is a plan view of the disk brake shown in FIG. 1.

A mounting member 2 serving as a carrier is secured to a non-rotating part of the vehicle. As shown in FIGS. 1 and 2, the mounting member 2 has a pair of arms 2A spaced apart from each other in the rotational (circumferential) direction of the disk 1 and extending over the outer periphery of the disk 1 in the axial direction of the disk 1. The proximal ends of the arms 2A are connected by a connecting portion 2B. The connecting portion 2B is secured to the non-rotating part of the vehicle at the inner side of the disk 1.

The mounting member 2 is integrally formed with a bow-shaped reinforcing beam 2C that connects together the distal ends of the arms 2A. The arms 2A are provided with respective pin holes 2D as shown by the dotted lines in FIG. 16. Sliding pins 5 (described later) are slidably fitted in the pin holes 2D, respectively.

Each arm 2A has a disk pass portion (not shown) at the middle in the longitudinal direction thereof (i.e. in the axial direction of the disk 1). The disk pass portion extends arcuately along the outer periphery (locus of rotation) of the disk 1. Inner and outer pad guides 3 (described later) are formed at both sides of the disk pass portion (at the axially opposite sides of the disk 1).

Figure 16:
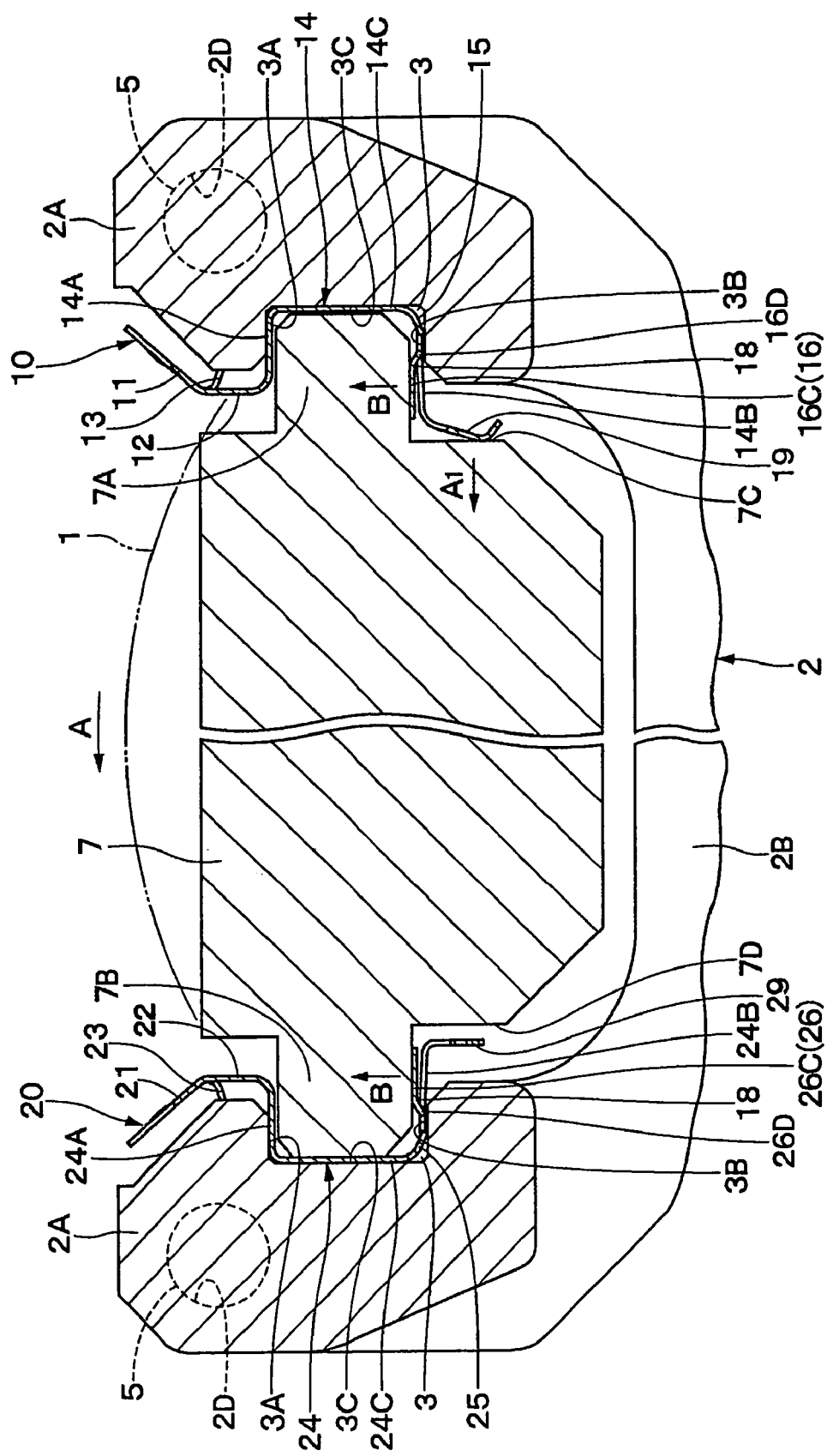
FIG. 16 is an enlarged sectional view of the pad springs attached to respective arms of a mounting member and one friction pad as seen in the direction of the arrow XVI-XVI in FIG. 2.

The pad guides 3 are provided on the respective arms 2A of the mounting member 2. As shown in FIGS. 1 and 16, the pad guides 3 are formed as U-grooves having a U-shaped sectional configuration and extend in a direction in which friction pads 7 (described later) are slidingly displaced (i.e. in the axial direction of the disk 1). The pad guides 3 are positioned at axially opposite sides of the above-described disk pass portion of each arm 2A. That is, the pad guides 3 are provided at the proximal end (inner side) and distal end (outer side) of each arm 2A. It should be noted that in FIGS. 1 and 16 only the outer pad guides 3 are shown, and illustration of the inner pad guides 3 is omitted.

Each pad guide 3 has, as shown in FIG. 16, a radially outer wall surface (hereinafter referred to as "upper wall surface 3A") located closer to the radially outer side of the disk 1, a radially inner wall surface (hereinafter referred to as "lower wall surface 3B") located closer to the radially inner side of the disk 1, and an inner wall surface 3C that connects together the wall surfaces 3A and 3B at the inner part of the pad guide 3. Thus, the pad guide 3 has a U-shaped sectional configuration defined by these wall surface 3A, 3B and 3C. The upper wall surface 3A and the lower wall surface 3B are parallel to each other and vertically spaced apart from each other as viewed in FIG. 16.

More specifically, the pad guides 3 are formed so that lug portions 7A and 7B of friction pads 7 (described later) are held from the upper and lower sides (in the radial direction of the disk 1) between the upper and lower wall surfaces 3A and 3B. Thus, the pad guides 3 guide the friction pads 7 in the axial direction of the disk 1 between the wall surfaces 3A and 3B. The inner wall surfaces 3C of the pad guides 3 function as torque receiving portions that bear braking torque that the friction pads 7 receive from the disk 1 during a braking operation through the lug portions 7A and 7B (described later).

A caliper 4 is slidably provided on the mounting member 2. As shown in FIGS. 1 and 2, the caliper 4 has an inner leg portion 4A provided at one side (inner side) of the disk 1, a bridge portion 4B extending from the inner leg portion 4A to the other side (outer side) of the disk 1 over the outer periphery of the disk 1 between the arms 2A of the mounting member 2, and an outer leg portion 4C extending radially inward of the disk 1 from the distal (outer) end of the bridge portion 4B and bifurcated at the distal end thereof.

The inner leg portion 4A of the caliper 4 is formed with a cylinder (not shown) in which a piston (not shown) is slidably fitted. The inner leg portion 4A is provided with a pair of mounting portions 4D projecting leftward and rightward, respectively, in FIG. 2. The mounting portions 4D are slidably supported by the arms 2A of the mounting member 2 through respective sliding pins 5 (described later).

The sliding pins 5 serve as support members that allow the caliper 4 to be slidably supported by the mounting member 2. The sliding pins 5 are fastened to the mounting portions 4D of the caliper 4 by using bolts 6, etc. The distal ends of the sliding pins 5 extend into the arms 2A of the mounting member 2. The distal end portions of the sliding pins 5 are slidably fitted in the respective pin holes 2D of the mounting member 2 as shown by the dotted lines in FIG. 16. Thus, the caliper 4 is slidably supported by the arms 2A of the mounting member 2 through the sliding pins 5.

The inner and outer friction pads 7 are disposed facing each other across the disk 1. Each friction pad 7 is constructed as a plate-shaped friction member extending in the rotational direction of the disk 1, as shown in FIGS. 1 and 16. The friction pad 7 has lug portions 7A and 7B at the back (backing plate) thereof. The lug portions 7A and 7B are provided as projections at both ends of the friction pad 7 in the longitudinal direction thereof (i.e. the circumferential direction of the disk 1).

The lug portions 7A and 7B of each friction pad 7 are formed in bilateral symmetry with the same shape, for example, as shown in FIG. 16. One lug portion 7A is disposed at the entrance side in the rotational direction of the disk 1, which rotates in the direction of the arrow A, (this side will hereinafter be referred to as "entrance side"). The other lug portion 7B is disposed at the exit side in the rotational direction of the disk 1 (this side will hereinafter be referred to as "exit side").

The lug portions 7A and 7B of the friction pad 7 are slidably fitted in the pad guides 3 of the mounting member 2 with guide plate portions 14 and 24 of pad springs 10 and 20 (described later) interposed therebetween. During a braking operation, the inner and outer friction pads 7 are pressed against both sides of the disk 1 by the caliper 4. At this time, the lug portions 7A and 7B are slidingly displaced along the pad guides 3 in the axial direction of the disk 1.

The friction pad 7 has flat surface portions 7C and 7D at both longitudinal ends thereof (at the entrance and exit sides in the rotational direction of the disk 1). The flat surface portions 7C and 7D extend radially inward of the disk 1 in respective directions substantially perpendicular to the directions in which the lug portions 7A and 7B project. Of the flat surface portions 7C and 7D of the friction pad 7, the flat surface portion 7C, which is located at the entrance side in the rotational direction of the disk 1, is resiliently contacted by a circumferentially urging portion 19 of the pad spring 10 (described later), whereby the friction pad 7 is constantly urged in the rotational direction of the disk 1 (in the direction of the arrow $A_1$ in FIG. 16).

The lug portion 7B, which is located at the exit side in the rotational direction of the disk 1, is resiliently pressed against the inner wall surface 3C of the pad guide 3 through an abutting plate 24C of the pad spring 20 (described later). During a braking operation, the exit-side lug portion 7B is caused to continuously abut against the inner wall surface 3C through the abutting plate 24C by braking torque (rotational torque in the direction of the arrow A) that the friction pad 7 receives from the disk 1. Thus, braking torque during the braking operation is borne by the contact between the abutting surfaces of the lug portion 7B and the inner wall surface 3C.

The entrance-side pad spring 10, which is disposed at the entrance side in the rotational direction of the disk 1, is attached to the entrance-side arm 2A of the mounting member 2 to resiliently support the inner and outer friction pads 7 between itself and the exit-side pad spring 20 (described later). In addition, the pad springs 10 and 20 allow smooth sliding displacement of the friction pads 7.

The pad spring 10 is integrally formed by bending a resilient stainless steel plate as shown in FIGS. 3 to 11 by using press working or other similar process. The pad spring 10 has a connecting plate portion 11, guide plate portions 14, radially urging portions 16, and circumferentially urging portions 19, which will be described below in detail.

The connecting plate portion 11 connects together the guide plate portions 14 of the pad spring 10. The connecting plate portion 11 is formed to extend axially over the outer periphery of the disk 1. The connecting plate portion 11 has a pair of flat plate portions 12 integrally formed at both longitudinal ends thereof. The flat plate portions 12 extend radially inward of the disk 1. The connecting plate portion 11 is bent outward relative to the flat plate portions 12 in a substantially "<" shape so as to be disposed along the inner surface of the associated arm 2A of the mounting member 2.

As shown in FIGS. 3 to 6, the connecting plate portion 11 has an engagement plate portion 13 integrally formed at the middle in the longitudinal direction thereof. The engagement plate portion 13 is bent relative to the connecting plate portion 11 in a substantially "<" shape to extend obliquely downward. The engagement plate portion 13 is secured to the above-described disk pass portion of the arm 2A in such a manner as to engage therewith from the radially inner side, thereby positioning the pad spring 10 with respect to the arm 2A of the mounting member 2 in the axial direction of the disk 1.

The guide plate portions 14 are provided at both ends of the connecting plate portion 11. The guide plate portions 14 are contiguous with the connecting plate portion 11 through the flat plate portions 12, respectively. Each guide plate portion 14 is formed by being bent from the distal end (lower end in FIG. 3) of one flat plate portion 12 in a substantially U shape. One of the guide plate portions 14 is fitted into the outer pad guide 3 shown in FIG. 16. The other guide plate portion 14 is fitted into the inner pad guide (not shown).

The guide plate portions 14 of the pad spring 10 each have, as shown in FIG. 16, a top plate 14A and a bottom plate 14B, which respectively oppose the upper and lower wall surfaces 3A and 3B of the pad guide 3, and an abutting plate 14C connecting between the top plate 14A and the bottom plate 14B and placed to abut against the inner wall surface 3C of the pad guide 3. The abutting plate 14C is formed as a plate-shaped member wider (in the axial direction of the disk 1) than the top plate 14A and the bottom plate 14B. The abutting plate 14C has a tongue plate portion 16A of a radially urging portion 16 (described later) formed at the widthwise outer end thereof.

The abutting plates 14C of the guide plate portions 14 have bent portions 14D formed at the upper corners projecting in the width direction (axial direction of the disk 1) beyond the associated top plates 14A. The bent portions 14D are bent obliquely to the abutting plates 14C. The top plates 14A of the guide plate portions 14 are integrally formed with claw projections 14E projecting in the width direction (axial direction of the disk 1). The claw projections 14E function as guides when the lug portions 7A of the friction pads 7 are fitted into the pad spring 10.

Figure 3:
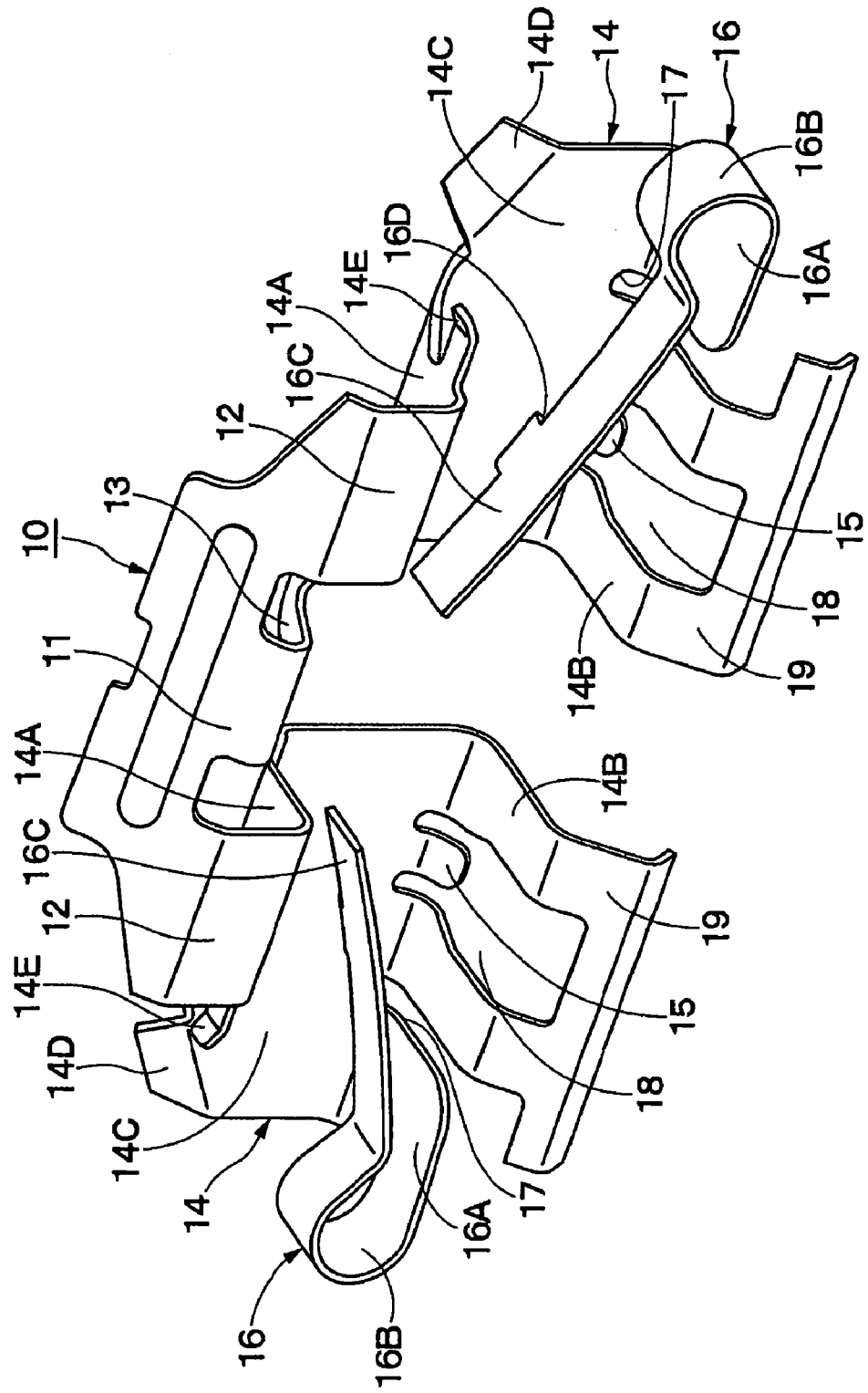
FIG. 3 is a perspective view showing an entrance-side pad spring as a single unit.
Figure 4:
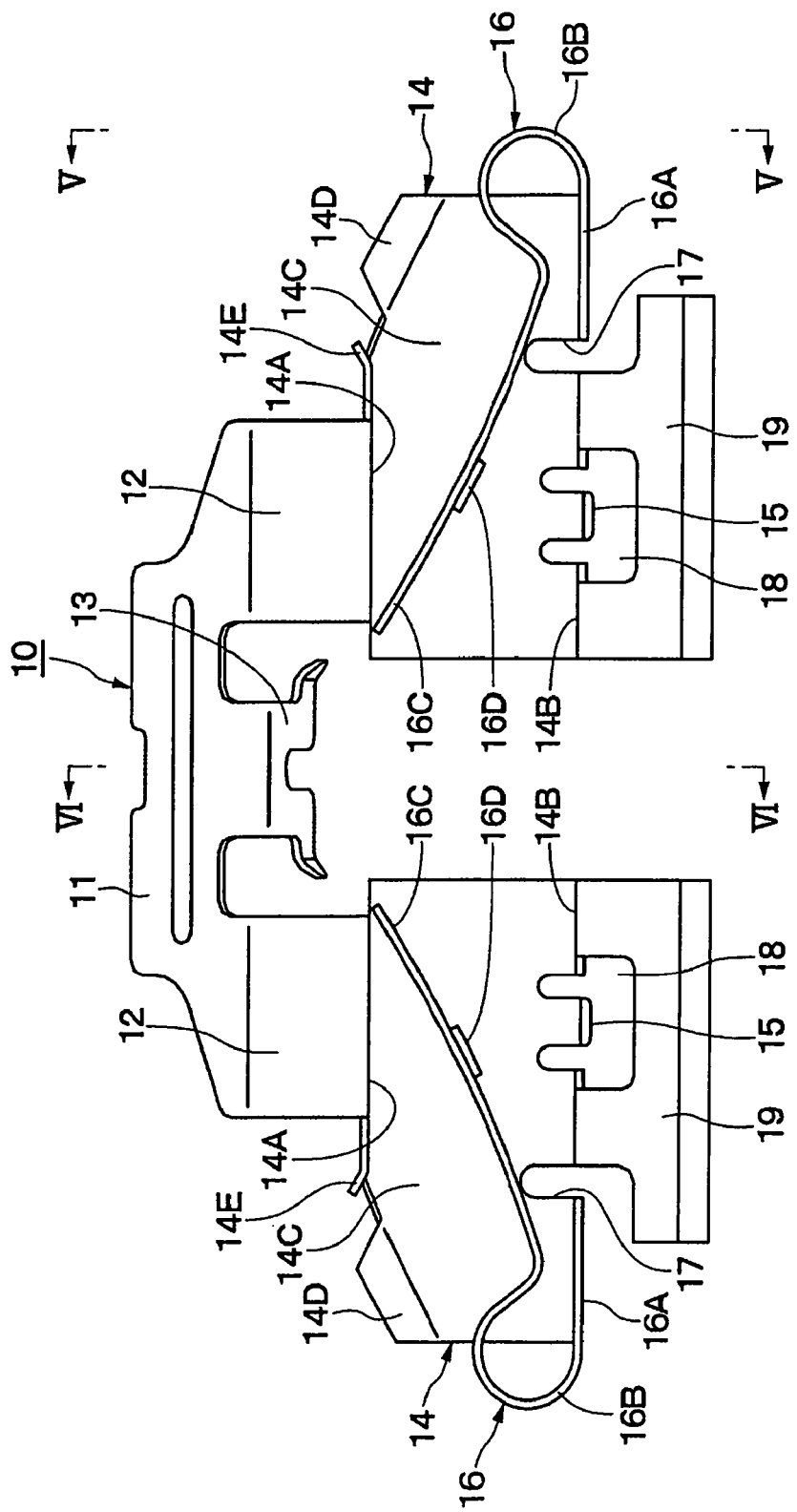
FIG. 4 is a front view of the pad spring shown in FIG. 3.
Figure 5:
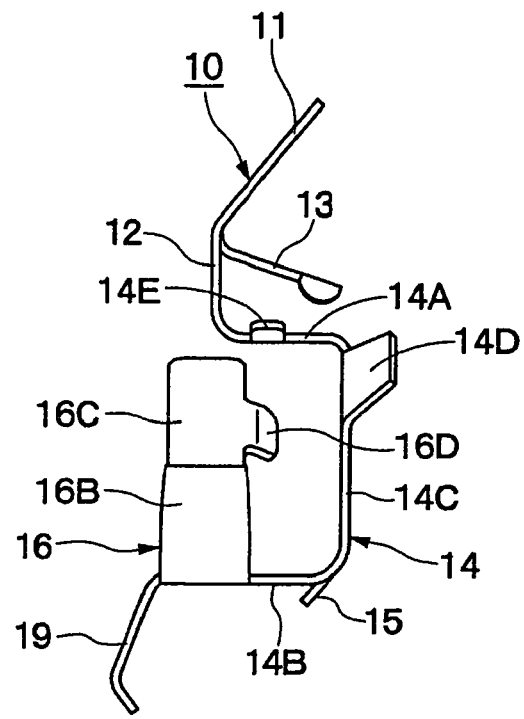
FIG. 5 is a side view of the pad spring as seen in the direction of the arrow V-V in FIG. 4.
Figure 6:
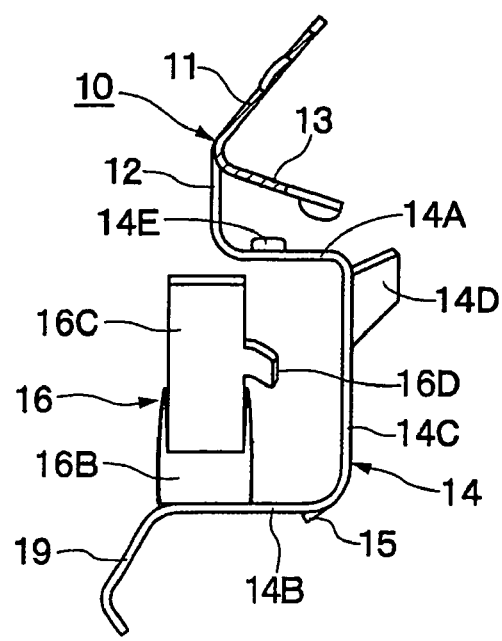
FIG. 6 is a sectional view of the pad spring as seen in the direction of the arrow VI-VI in FIG. 4.
Figure 17:
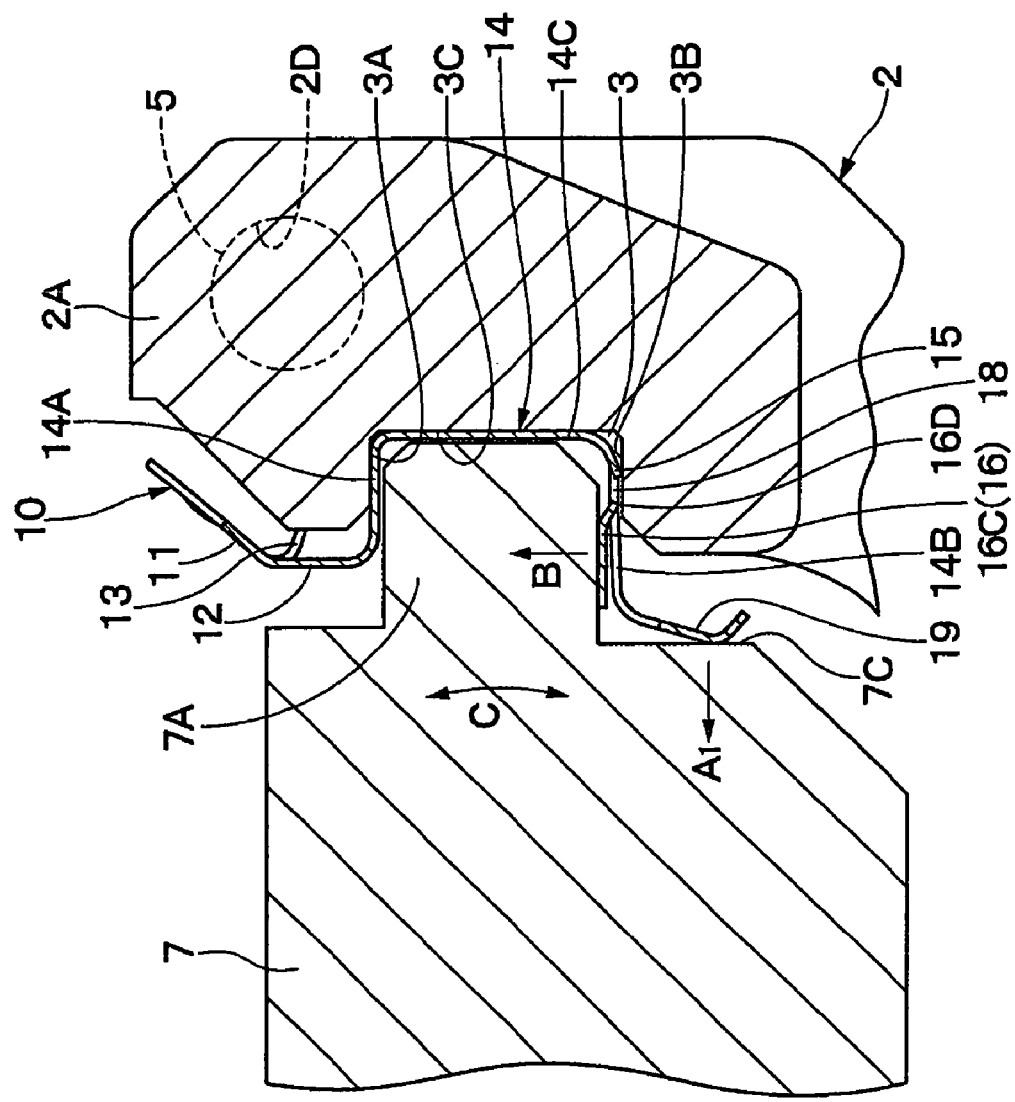
FIG. 17 is a fragmentary enlarged sectional view showing a state when the friction pad in FIG. 16 vibrates.

Claw portions 15 are each provided between the bottom plate 14B and the abutting plate 14C of each guide plate portion 14. Each claw portion 15 is, as shown in FIG. 3, formed as a claw with a substantially U-shaped outer configuration that projects from the lower end of the abutting plate 14C into a space portion 18 (described later). As shown in FIGS. 16 and 17, the claw portion 15 is fitted into the pad guide 3, together with the guide plate portion 14, and the distal end of the claw portion 15 resiliently contacts the lower wall surface 3B of the pad guide 3.

Thus, the distal end of the claw portion 15 is engaged with the lower wall surface 3B of the pad guide 3 (i.e. the radially inner wall surface thereof as viewed in the radial direction of the disk 1) in an elastically deformed and frictionally latched state. Counterforce produced from the resilient engagement of the claw portion 15 with the lower wall surface 3B resiliently presses the top plate 14A of the guide plate portion 14 against the upper wall surface 3A of the pad guide 3, thereby bringing the top plate 14A into contact (plane contact) with the upper wall surface 3A. At the same time, the bottom plate 14B of the guide plate portion 14 is separated from the lower wall surface 3B of the pad guide 3 with a small gap therebetween and also the guide plate portion 14 is held in the pad guide 3 so as not to fall off.

The radially urging portions 16 urge the friction pads 7 radially outward of the disk 1. Each radially urging portion 16 has a tongue plate portion 16A projecting from the abutting plate 14C of the guide plate portion 14 substantially parallel to the bottom plate 14B at a position outward of the bottom plate 14B in the width direction (axial direction of the disk 1). The radially urging portion 16 further has a folded portion 16B whose proximal end is integral with the tongue plate portion 16A, and an urging plate portion 16C projecting from the distal end of the folded portion 16B.

The folded portion 16B and the urging plate portion 16C of the radially urging portion 16 are integrally formed as an elongated plate-shaped member extending axially of the disk 1 from the widthwise outer end of the tongue plate portion 16A [i.e. the end opposite to the end where a cut 17 (described later) is provided]. The proximal end portion of the elongated plate-shaped member is folded radially outward of the disk 1 in a substantially U or C shape, whereby the folded portion 16B is formed as an arcuately bent portion.

Figure 7:
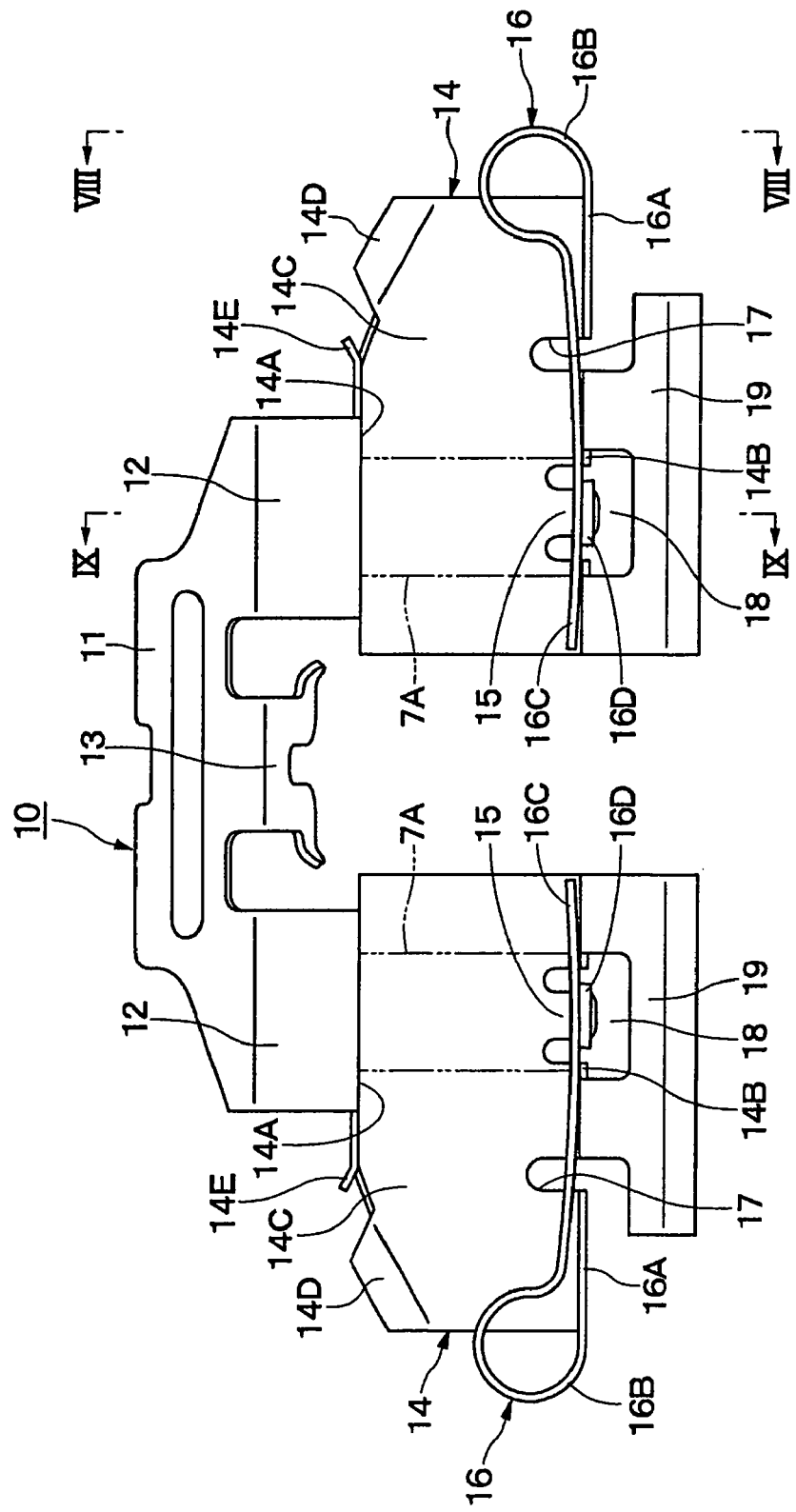
FIG. 7 is a front view of the pad spring, showing a state where radially urging portions are deflected onto respective bottom plates by lug portions of friction pads.
Figure 8:
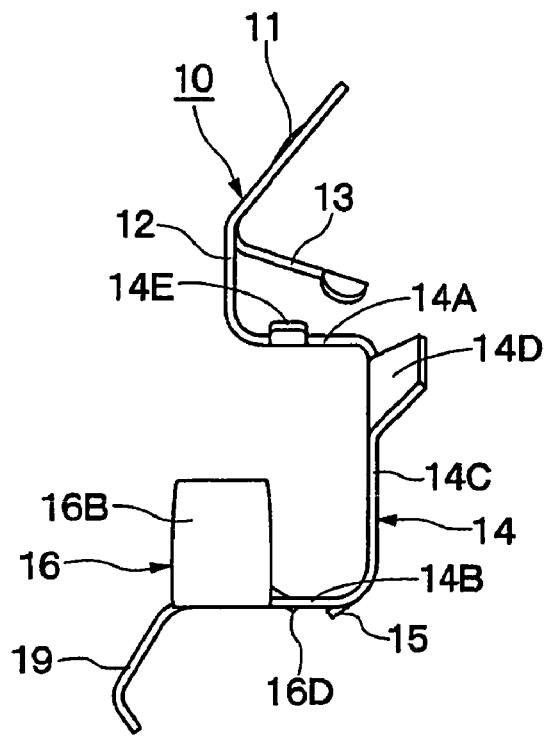
FIG. 8 is a side view of the pad spring as seen in the direction of the arrow VIII-VIII in FIG. 7.
Figure 9:
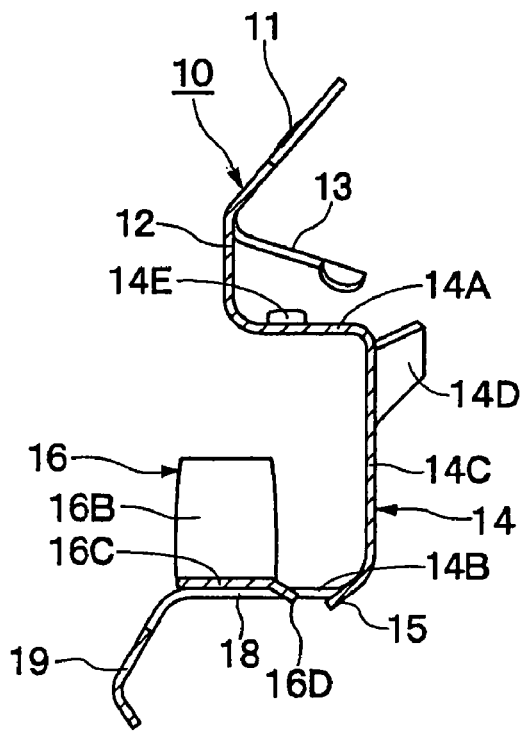
FIG. 9 is a sectional view of the pad spring as seen in the direction of the arrow IX-IX in FIG. 7.
Figure 10:
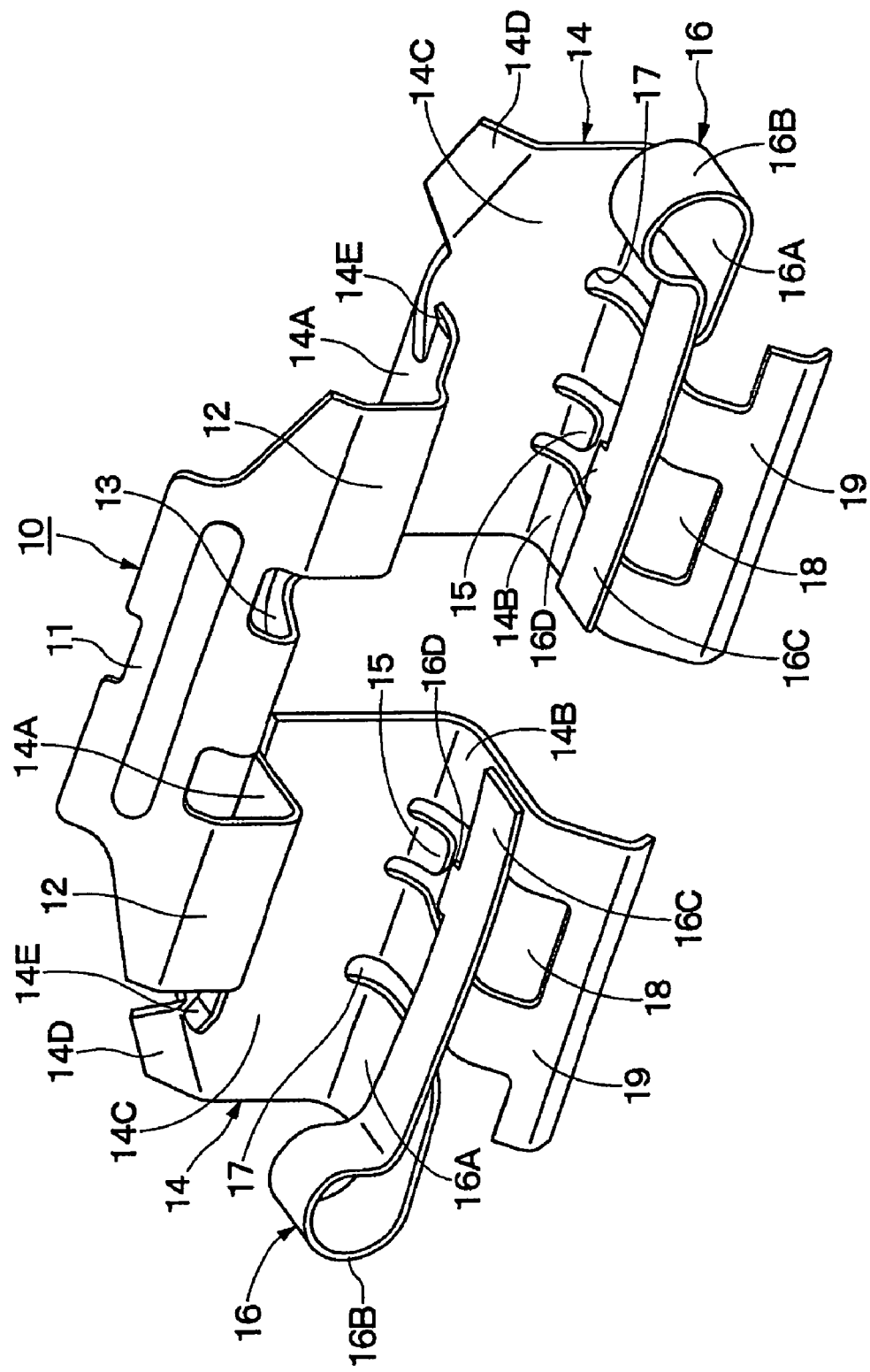
FIG. 10 is a perspective view of the pad spring shown in FIG. 7.
Figure 11:
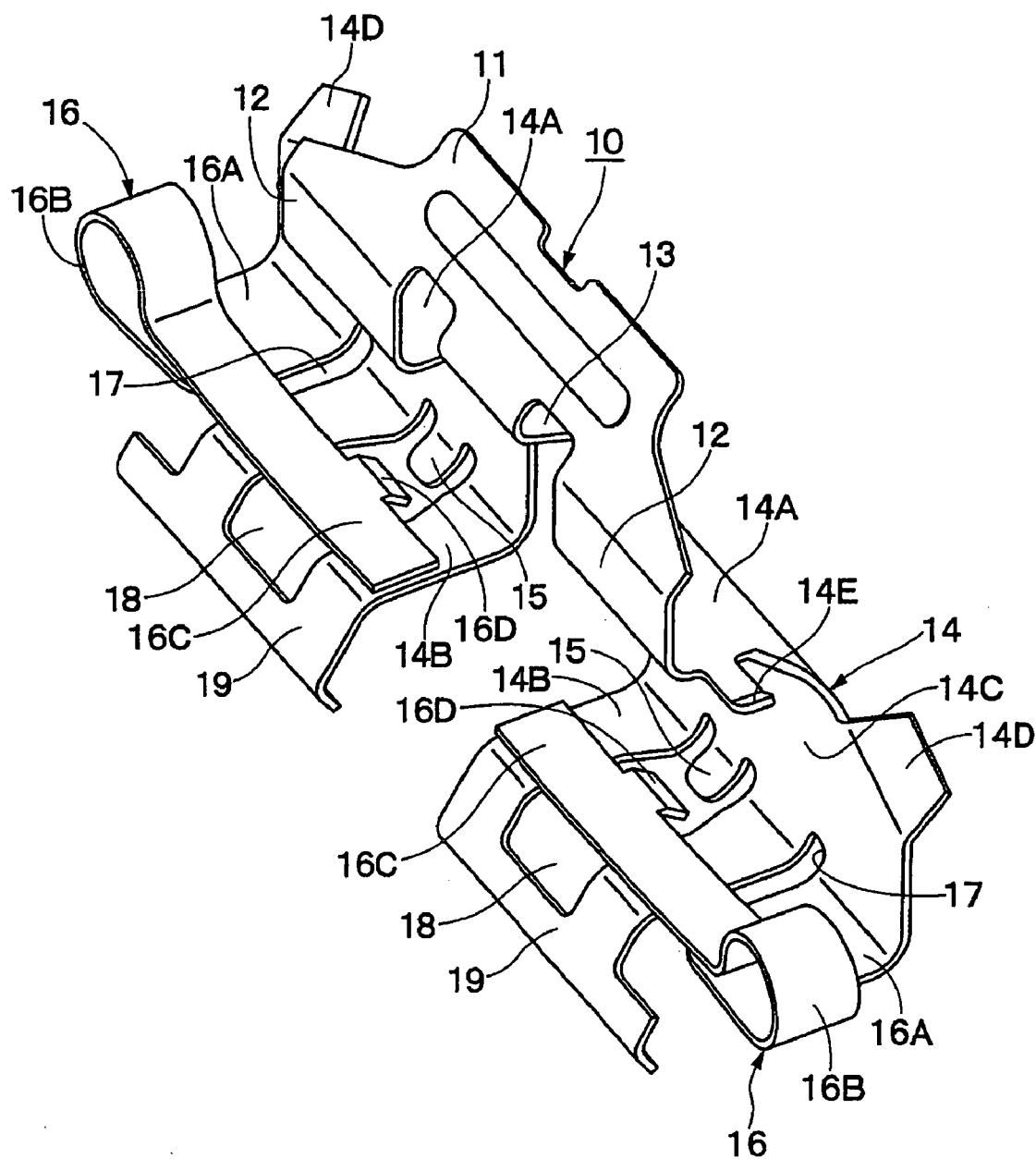
FIG. 11 is a perspective view of the pad spring as seen from an angle different from that in FIG. 10.
Figure 12:
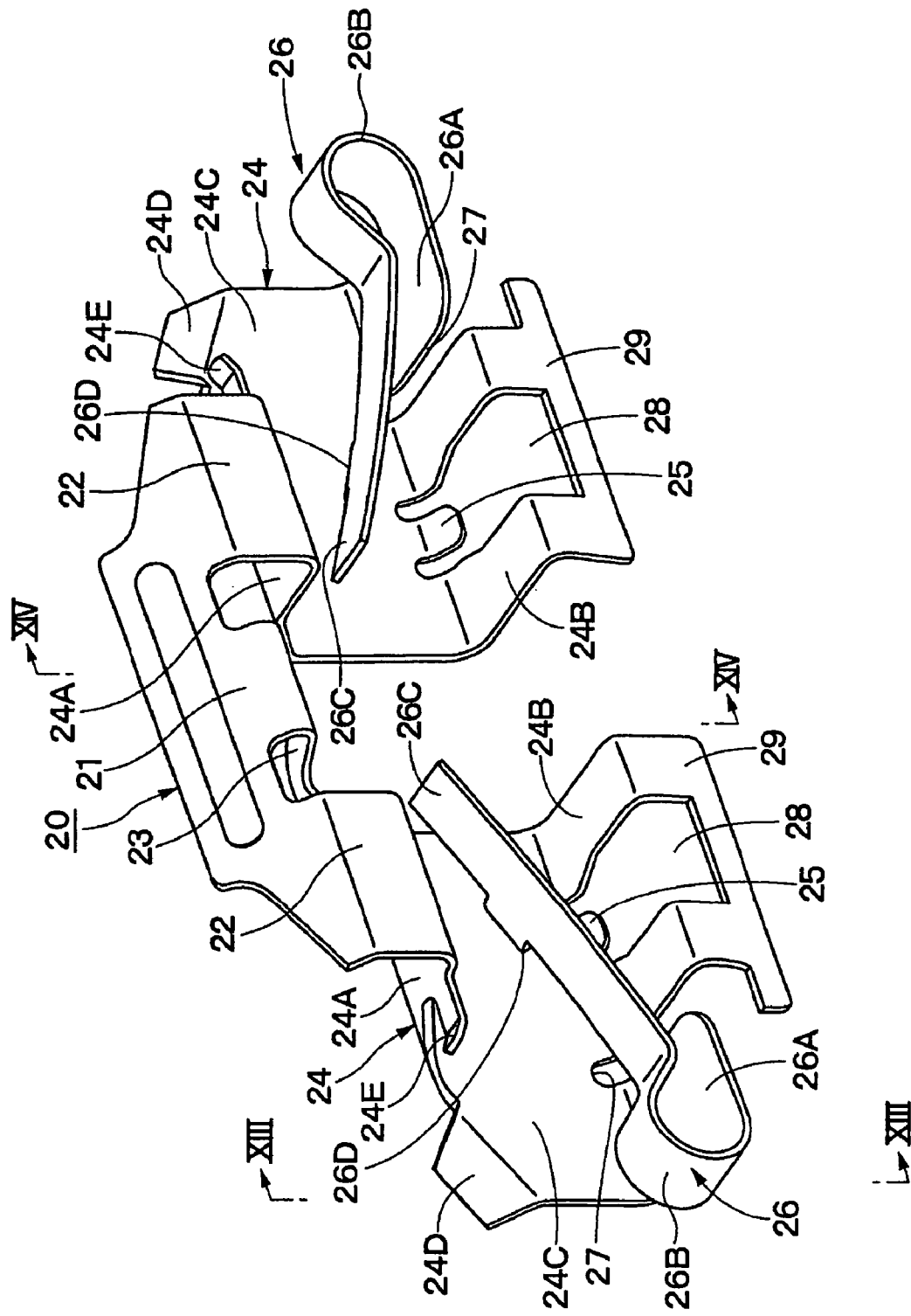
FIG. 12 is a perspective view showing an exit-side pad spring as a single unit.
Figure 13:
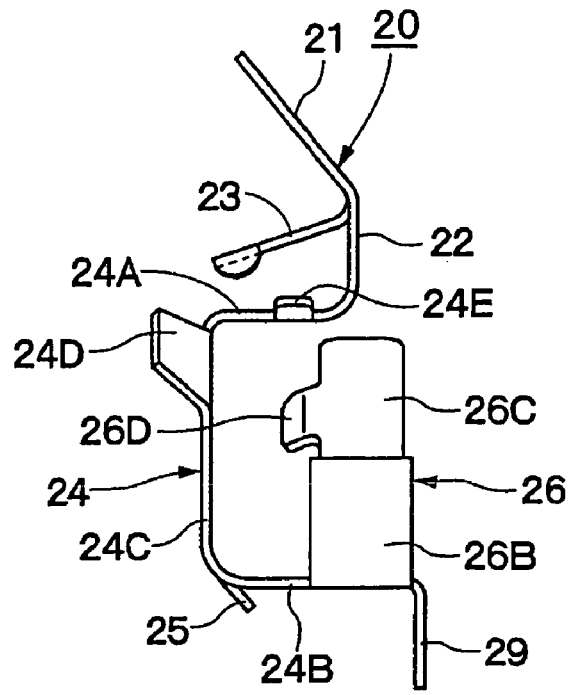
FIG. 13 is a side view of the pad spring as seen in the direction of the arrow XIII-XIII in FIG. 12.
Figure 14:
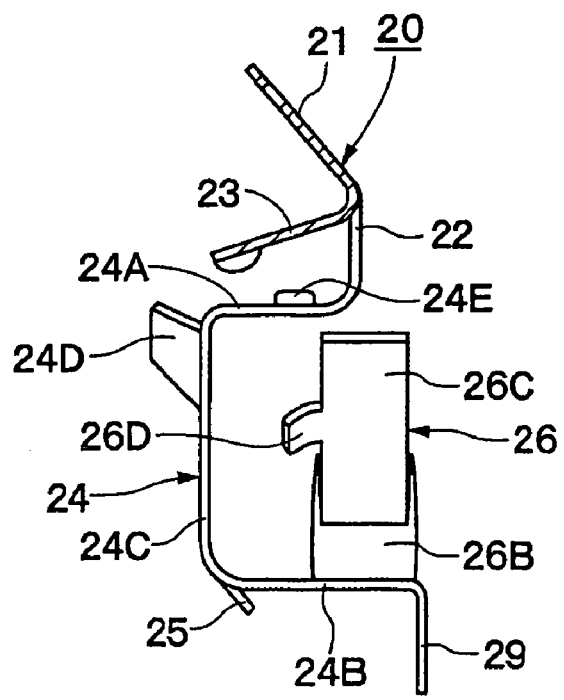
FIG. 14 is a sectional view of the pad spring as seen in the direction of the arrow XIV-XIV in FIG. 12.
Figure 15:
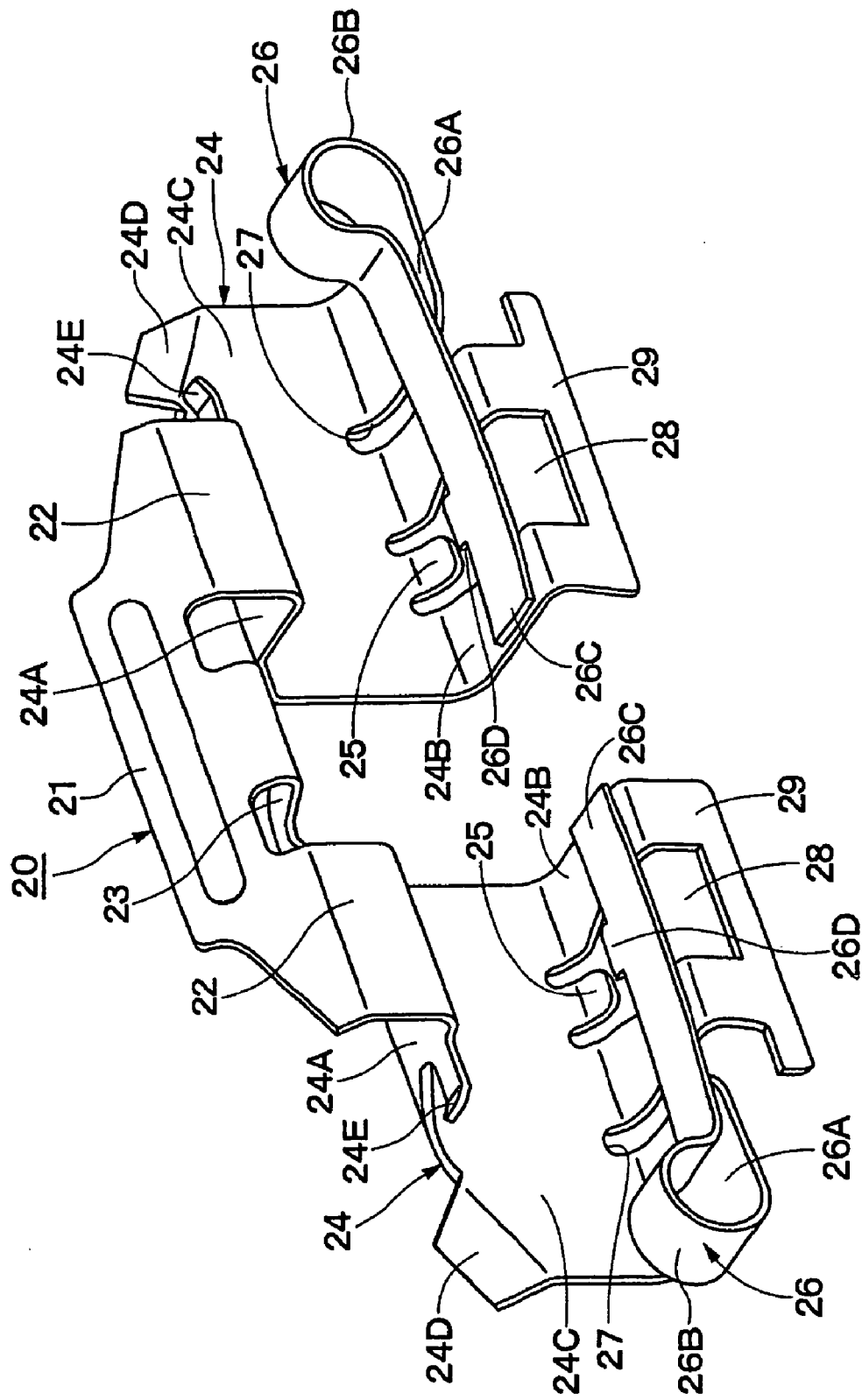
FIG. 15 is a perspective view of the pad spring, showing a state where radially urging portions in FIG. 12 are deflected onto respective bottom plates.

The urging plate portion 16C is formed as an elongated plate-shaped spring member extending from the distal end of the folded portion 16B obliquely radially outward of the disk 1. The distal end of the urging plate portion 16C is a free end extending as far as a position directly above the bottom plate 14B of the guide plate portion 14. As shown in FIGS. 7 and 16, the urging plate portion 16C of the radially urging portion 16 is elastically deflected and deformed so as to be pressed toward the bottom plate 14B of the guide plate portion 14 when the lug portion 7A of the friction pad 7 is fitted into the guide plate portion 14 (see FIGS. 7 to 11).

Thus, the urging plate portion 16C of the radially urging portion 16 is disposed to extend axially of the disk 1 between the bottom plate 14B of the guide plate portion 14 and the lug portion 7A of the friction pad 7. Resilient counterforce from the urging plate portion 16C urges the lug portion 7A of the friction pad 7 in the direction of the arrow B in FIG. 16 toward the radially outer side of the disk 1.

The lug portion 7A of the friction pad 7 is resiliently pressed toward the top plate 14A of the guide plate portion 14 (i.e. the upper wall surface 3A of the pad guide 3) by the urging force (resilient counterforce) of the radially urging portion 16. Consequently, the lug portion 7A of the friction pad 7 is restrained from rattling in the pad guide 3 (i.e. the guide plate portion 14) in the direction of the arrow B in FIG. 16.

The urging plate portion 16C of the radially urging portion 16 has a projection 16D formed on a longitudinally intermediate portion thereof. The projection 16D is bent radially inward of the disk 1 in a substantially "<" shape. As shown in FIGS. 7, 9 to 11, the projection 16D is disposed at a position corresponding (facing) to a space portion 18 (described later).

Accordingly, when the urging plate portion 16C of the radially urging portion 16 is displaced in the direction of approaching the bottom plate 14B of the guide plate portion 14, i.e. radially inward of the disk 1, the projection 16D resiliently abuts against the lower wall surface 3B of the pad guide 3, as shown in FIG. 17, thereby keeping the urging plate portion 16C of the radially urging portion 16 from contacting the bottom plate 14B, and thus preventing excessive stress from being applied to the bottom plate 14B and so forth. This will be described later in detail.

Slit-like cuts 17 are each provided between the bottom plate 14B of each guide plate portion 14 and the tongue plate portion 16A of the associated radially urging portion 16. Each cut 17 is formed so that the bottom plate 14B and the tongue plate portion 16A, which are in substantially the same plane, are isolated from each other in the width direction (axial direction of the disk 1).

The cut 17 has the function of minimizing the effect of deformation of the radially urging portion 16 over the bottom plate 14B of the guide plate portion 14 and the circumferentially urging portion 19 thereof (described later), for example, thereby allowing the radially urging portion 16 and the circumferentially urging portions 19 to be elastically deformed independently of each other.

Space portions 18 are formed in the respective bottom plates 14B of the guide plate portions 14. The space portions 18 are substantially rectangular openings (cut holes) as shown in FIG. 3. One end of each space portion 18 (i.e. the end thereof closer to the abutting plate 14C of the guide plate portion 14) extend in the shape of narrow slits along both sides of the claw portion 15. The other end of the space portion 18 extends as a wide U-shaped opening as far as an intermediate position of the circumferentially urging portion 19 (described later).

As shown in FIGS. 7, 9 to 11, the space portion 18 is disposed at a position corresponding (facing) to the projection 16D of the radially urging portion 16. When the urging plate portion 16C of the radially urging portion 16 is displaced toward the bottom plate 14B of the guide plate portion 14, i.e. radially inward of the disk 1, the space portion 18 allows the projection 16D to abut against the lower wall surface 3B of the pad guide 3, as shown in FIG. 17. Properly adjusting the size of the space portion 18 makes it possible to change the rigidity of the bottom plate 14B and hence possible to adjust the resilient force (urging force) of the circumferentially urging portion 19 (described later).

The circumferentially urging portions 19 urge the friction pads 7 in the rotational (circumferential) direction of the disk 1. As shown in FIGS. 3 to 11, each circumferentially urging portion 19 is formed as a plate-shaped member wider than the bottom plate 14B of the guide plate portion 14. The circumferentially urging portion 19 is bent from the distal end of the bottom plate 14B obliquely radially inward of the disk 1. It should be noted that the circumferentially urging portion 19 is sufficiently wide to resiliently abut against the flat surface portion 7C of the friction pad 7 throughout the service life of the friction pad 7, from the time when it is new until it has become fully worn, as will be described later.

The circumferentially urging portion 19 is formed as a wide plate-shaped spring member bent in a "<" shape over the entire widthwise length thereof. The bent part of the circumferentially urging portion 19 is resiliently abutted against the flat surface portion 7C of the friction pad 7 as shown in FIGS. 16 and 17. Thus, the circumferentially urging portion 19 urges the flat surface portion 7C of the friction pad 7 in the direction of the arrow $A_1$ substantially corresponding to the rotational (circumferential) direction of the disk 1 (i.e. the direction of the arrow A in FIG. 16). The urging force at this time is also given by the bottom plate 14B of the guide plate portion 14 in cooperation with the circumferentially urging portion 19. It should be noted that the bottom plate 14B of the guide plate portion 14 is separated from the lower wall surface 3B of the pad guide 3 with a small gap therebetween, as stated above. Therefore, the bottom plate 14B is allowed to function as a resilient member over the entire length thereof in the circumferential direction of the disk 1, thereby enabling the resilient force (urging force) of the circumferentially urging portion 19 to be properly adjusted so as not to become excessively strong.

The exit-side pad spring 20, which is disposed at the exit side in the rotational direction of the disk 1, is attached to the exit-side arm 2A of the mounting member 2 to resiliently support the inner and outer friction pads 7 between itself and the above-described entrance-side pad spring 10. In addition, the pad springs 10 and 20 allow smooth sliding displacement of the friction pads 7.

The exit-side pad spring 20 is arranged substantially in the same way as the above-described entrance-side pad spring 10. As shown in FIGS. 12 to 15, the pad spring 20 has a connecting plate portion 21, flat plate portions 22, an engagement plate portion 23, guide plate portions 24, claw portions 25, radially urging portions 26, cuts 27, and space portions 28.

Unlike the entrance-side pad spring 10, the exit-side pad spring 20 does not have circumferentially urging portion 19, but instead has bent plate portions 29. That is, each bent plate portion 29 is formed as a plate-shaped member wider than a bottom plate 24B of a guide plate portion 24 (described later). The bent plate portion 29 differs from the circumferentially urging portion 19 in that the bent plate portion 29 is bent from the distal end of the bottom plate 24B radially inward substantially perpendicularly to the plane of the bottom plate 24B.

The guide plate portions 24 of the exit-side pad spring 20 each have a top plate 24A, a bottom plate 24B, an abutting plate 24C, a bent portion 24D, and a claw projection 24E. The radially urging portions 26 each have a tongue plate portion 26A, a folded portion 26B, an urging plate portion 26C, and a projection 26D.

With the exit-side pad spring 20, as shown in FIG. 16, the bent plate portion 29 is separate from the flat surface portion 7D of the friction pad 7 at all times to allow the friction pad 7 to be urged by the circumferentially urging portion 19 of the entrance-side pad spring 10 in the direction of the arrow $A_1$.

The disk brake according to this embodiment is arranged as stated above. The disk brake operates as follows.

When the brake of the vehicle is activated, a brake fluid pressure is supplied into the inner leg portion 4A (cylinder) of the caliper 4, causing the piston to be slidingly displaced toward the disk 1, whereby the inner friction pad 7 is pressed against one side of the disk 1. At this time, the caliper 4 receives pressing counterforce from the disk 1. Therefore, the whole caliper 4 is slidingly displaced toward the inner side relative to the arms 2A of the mounting member 2. Consequently, the outer leg portion 4C presses the outer friction pad 7 against the other side of the disk 1.

Thus, the inner and outer friction pads 7 can strongly hold the disk 1 rotating in the direction of the arrow A in FIGS. 1 and 16 between them from both sides in the axial direction of the disk 1, thereby applying braking force to the disk 1. When the braking operation is canceled, the supply of the fluid pressure to the piston is stopped. Consequently, the inner and outer friction pads 7 separate from the disk 1 and return to their non-braking positions.

When the brake is activated and when the braking operation is canceled (i.e. when the brake is not activated), one of the flat surface portions 7C and 7D of each friction pad 7 that is located at the entrance side in the rotational direction of the disk 1, i.e. the flat surface portion 7C, is urged in the direction of the arrow $A_1$ in FIG. 16 by the circumferentially urging portion 19 of the pad spring 10. Thus, the friction pad 7 is constantly urged in the rotational (circumferential) direction of the disk 1. The lug portion 7B that is located at the exit side in the rotational direction of the disk 1 is resiliently pressed against the inner wall surface 3C of the pad guide 3 through the abutting plate 24C of the pad spring 20 by the urging force of the circumferentially urging portion 19 of the entrance-side pad spring 10. In this case, the urging force of the circumferentially urging portion 19 is substantially constant throughout the service life of the friction pad 7, from the time when it is new until it has become fully worn, and will not change to a considerable extent as in the prior art.

Accordingly, the circumferentially urging portion 19 provided on the entrance-side pad spring 10 can restrain the friction pad 7 from rattling in the circumferential direction of the disk 1 owing to vibration or the like during the running of the vehicle. During the braking operation, the friction pad 7 receives braking torque (rotational torque in the direction of the arrow A) from the disk 1. At this time, the exit-side lug portion 7B continues to abut against the inner wall surface 3C through the abutting plate 24C. Accordingly, the braking torque during the braking operation can be borne by the exit-side arm 2A (inner wall surface 3C).

The lug portions 7A and 7B of the friction pad 7 are slidably fitted into the pad guides 3 that are located at the entrance and exit sides, respectively, in the rotational direction of the disk 1, with the guide plate portions 14 and 24 of the pad springs 10 and 20 interposed therebetween, and urged in the directions of the arrows B in FIG. 16 by the urging plate portions 16C and 26C of the radially urging portions 16 and 26. Thus, the lug portions 7A and 7B of the friction pad 7 can be resiliently pressed against the respective top plates 14A and 24A of the guide plate portions 14 and 24.

Accordingly, the friction pad 7 can be restrained from rattling in the radial direction of the disk 1 owing to vibration during running of the vehicle by the radially urging portions 16 and 26 of the pad springs 10 and 20. During the braking operation, the inner and outer friction pads 7 can be smoothly guided in the axial direction of the disk 1 along the guide plate portions 14 and 24 with the lug portions 7A and 7B of the friction pads 7 kept in sliding contact with the top plates 14A and 24A of the guide plate portions 14 and 24.

Regarding the pad spring 10 located at the entrance side in the rotational direction of the disk 1, by way of example, the radially urging portion 16 has the tongue plate portion 16A, the folded portion 16B and the urging plate portion 16C. The urging plate portion 16C is formed as an elongated plate-shaped spring member. Therefore, the urging force for urging the lug portion 7A of the friction pad 7 in the direction of the arrow B in FIG. 16 can be prevented from becoming excessively strong.

During the braking operation of the vehicle, however, braking torque from the disk 1 acts on the friction pad 7, and this may cause the friction pad 7 to vibrate in the direction of the arrow C in FIG. 17. On such an occasion, the lug portion 7A of the friction pad 7 presses the urging plate portion 16C of the radially urging portion 16 in the direction of approaching the bottom plate 14B of the guide plate portion 14 (opposite to the direction of the arrow B). If the urging plate portion 16C of the radially urging portion 16 abuts against the bottom plate 14B of the guide plate portion 14, excessive stress will be applied to the bottom plate 14B and the circumferentially urging portion 19. Particularly because the bottom plate 14B of the guide plate portion 14 is separated from the lower wall surface 3B of the pad guide 3 with a small gap therebetween by the claw portion 15, the joint between the abutting plate 14C and the bottom plate 14B where stress concentrates may be damaged in the worst case.

In view of the above, according to this embodiment, the urging plate portion 16C of the radially urging portion 16 is provided with a projection 16D bent radially inward of the disk 1 from a longitudinally intermediate portion of the urging plate portion 16C. The projection 16D is disposed at a position corresponding (facing) to the space portion 18 formed in the bottom plate 14B of the guide plate portion 14.

With this arrangement, even if the friction pad 7 vibrates in the direction of the arrow C in FIG. 17 owing to the influence of braking torque during the braking operation of the vehicle, for example, and the urging plate portion 16C of the radially urging portion 16 is displaced radially inward of the disk 1 so as to approach the bottom plate 14B of the guide plate portion 14, the projection 16D resiliently abuts against the lower wall surface 3B of the pad guide 3, and the urging plate portion 16C of the radially urging portion 16 will not abut against the bottom plate 14B. Accordingly, it is possible to prevent excessive stress from being applied to the bottom plate 14B and the circumferentially urging portion 19.

Thus, the projection 16D formed on the urging plate portion 16C of the radially urging portion 16 can bear external force due to vibration in the direction of the arrow C by abutting against the lower wall surface 3B of the pad guide 3 and prevent excessive stress from being applied to the bottom plate 14B of the guide plate portion 14 and the circumferentially urging portion 19.

Accordingly, the projection 16D of the radially urging portion 16 of the pad spring 10 can prevent the urging plate portion 16C from being deformed so as to overlie the bottom plate 14B of the guide plate portion 14 strongly when vibration occurs as stated above. Thus, it is possible to increase the overall durability, service life and so forth of the pad spring 10 and to improve reliability.

It should be noted that the above-described advantageous effect of the projection 16D of the entrance-side pad spring 10 can also be said of the projection 26D of the exit-side pad spring 20. The projection 26D formed on the urging plate portion 26C of the radially urging portion 26 can bear external force due to vibration applied in the direction opposite to the direction of the arrow B in FIG. 16 by abutting against the lower wall surface 3B of the pad guide 3 and prevent excessive stress from being applied to the bottom plate 24B of the guide plate portion 24.

Further, according to this embodiment, one of the pair of pad springs 10 and 20 that is located at the entrance side in the rotational direction of the disk 1, i.e. the pad spring 10, is provided with circumferentially urging portions 19 in addition to the guide plate portions 14 and the radially urging portions 16. Each circumferentially urging portion 19 is formed as a wide plate-shaped member bent from the bottom plate 14B of the guide plate portion 14 obliquely radially inward of the disk 1 to urge the friction pad 7 in the rotational direction of the disk 1.

Therefore, the urging force (spring load) of the circumferentially urging portion 19 can be set greater than in the prior art. Accordingly, the flat surface portion 7C of the friction pad 7 can continue to be urged strongly in the rotational direction of the disk 1 (in the direction of the arrow $A_1$ in FIG. 16). Moreover, the urging direction can be oriented substantially parallel to the plane of the disk 1. Therefore, the inner and outer friction pads 7 can be prevented from tilting with respect to the disk 1.

Accordingly, the attitude of each friction pad 7 with respect to the disk 1 can be stabilized by urging the flat surface portion 7C of the friction pad 7 in the rotational direction of the disk 1 (i.e. in the direction of the arrow $A_1$ in FIG. 16) with the circumferentially urging portion 19, and the sliding characteristics and so forth of the inner and outer friction pads 7 can be maintained favorably.

Further, because the circumferentially urging portion 19 is bent from the bottom plate 14B of the guide plate portion 14 obliquely radially inward of the disk 1, the circumferentially urging portion 19 will not interfere with the assembling operation when the pad spring 10 is attached to the arm 2A of the mounting member 2 and when the friction pad 7 is fitted to the pad spring 10. Accordingly, the assembling operation efficiency can be improved, and it is possible to prevent the urging force of the circumferentially urging portion 19 from varying during the assembling operation.

The radially urging portion 16 and the circumferentially urging portion 19, which are provided on the pad spring 10 as stated above, can suppress rattling of the friction pad 7 in the radial and rotational directions of the disk 1. Thus, vibration of the friction pad 7 can be suppressed favorably, and occurrence of brake noise or the like can be prevented.

Meanwhile, the pad spring 10 located at the entrance side in the rotational direction of the disk 1 is provided with claw portions 15 that are fitted into the pad guides 3 of the mounting member 2, together with the guide plate portions 14. Therefore, by bringing each claw portion 15 into resilient contact with the lower wall surface 3B of the pad guide 3, the guide plate portion 14 of the pad spring 10 is pressed against the pad guide 3 radially outward of the disk 1, and at the same time, the bottom plate 14B of the guide plate portion 14 is separated from the lower wall surface 3B of the pad guide 3, thereby enabling urging force of the circumferentially urging portion 19 to be generated stably. At the same time, the guide plate portion 14 of the pad spring 10 can be held in the pad guide 3 so as not to fall off (detent effect), and the assembled attitude of the pad spring 10 with respect to the arm 2A of the mounting member 2 can be stabilized.

In addition, the pad spring 10 has a slit-like cut 17 formed between the bottom plate 14B of each guide plate portion 14 and the tongue plate portion 16A of the associated radially urging portion 16. Therefore, the radially urging portion 16 and the circumferentially urging portion 19 can be elastically deformed independently of each other. Accordingly, the deformation of the radially urging portion 16, for example, can be prevented from affecting the circumferentially urging portion 19.

Consequently, it is possible to prevent excessive stress from being applied to the radially urging portion 16 and the circumferentially urging portion 19 and to suppress the occurrence of stress concentration and the like. Moreover, because the respective urging forces of the radially urging portion 16 and the circumferentially urging portion 19 applied to the friction pad 7 are independent of each other, the pad attitude can be stabilized.

Figure 18:
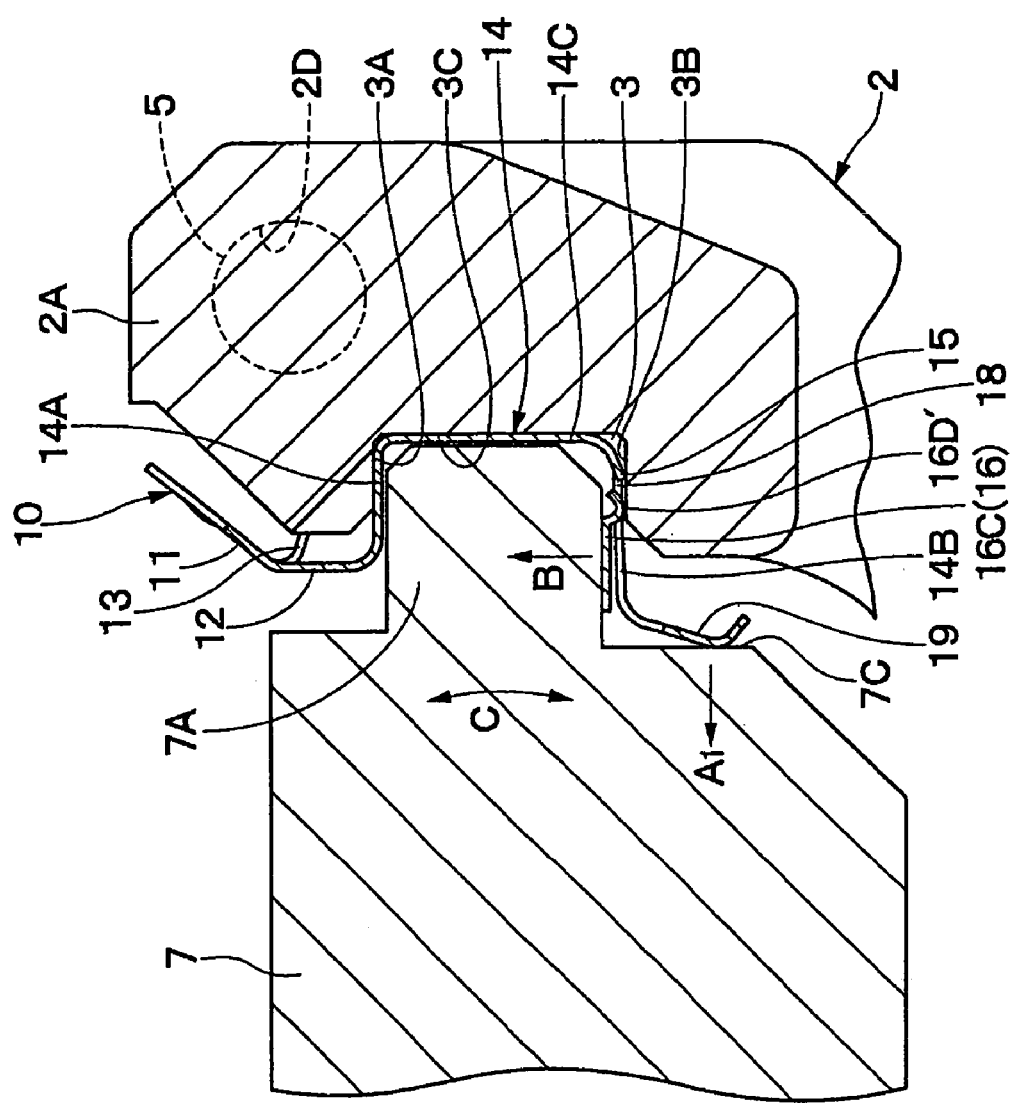
FIG. 18 is a fragmentary enlarged sectional view similar to FIG. 17, showing a pad spring according to a modification of the present invention.

In the foregoing embodiment, the projection 16D formed on the urging plate portion 16C of the radially urging portion 16 is bent obliquely radially inward of the disk 1 (downward in FIG. 17), by way of example. It should be noted, however, that the present invention is not necessarily limited to the described arrangement. For example, the projection 16D may be replaced with a projection 16D' bent in a substantially U or V shape as shown in a modification of FIG. 18.

More specifically, the projection 16D' according to the modification is arranged so that the projecting surface side thereof abuts against the lower wall surface 3B of the pad guide 3, whereby the urging plate portion 16C can be prevented from being deformed so as to overlie the bottom plate 14B of the guide plate portion 14 strongly. The projection 26D of the exit-side pad spring 20 can also be modified in the same way as the projection 16D'.

In the foregoing embodiment, the projection 16D is disposed at a position corresponding to the space portion 18. The projection 16D is, however, provided for achieving such function that the urging plate portion 16C of the radially urging portion 16 does not abut directly on the bottom plate 14B of the guide plate portion 14. Therefore, the projection 16D may be arranged to abut on the claw portion 15.

In the foregoing embodiment, the exit-side pad spring 20 has the connecting plate portion 21, the flat plate portions 22, the engagement plate portion 23, the guide plate portions 24, the claw portions 25, the radially urging portions 26, the cuts 27, and the space portions 28 as shown in FIGS. 12 to 15, by way of example. The present invention is, however, not necessarily limited to the described arrangement. For example, the projection 26D may be arranged in the same way as the projection 16D' in the modification shown in FIG. 18. The projection 26D may also be arranged to abut on the claw portion 25. Further, the exit-side pad spring 20 may be arranged as in the disk brake disclosed in Japanese Utility Model Application Public Disclosure (KOKAI) No. Hei 5-89978, which has been mentioned in the discussion of the prior art.

In the foregoing embodiment, the pad springs 10 and 20 are each formed in a substantially U shape so as to extend over the outer periphery of the disk 1, by way of example. The present invention is, however, not necessarily limited to the described arrangement. For example, the pad springs 10 and 20 may be each replaced with a pair of pad springs having respective configurations similar to those obtained when the pad springs 10 and 20 are cut along the respective centers of the connecting plate portions 11 and 21, and the two pad springs may be disposed at the inner and outer sides, respectively, of the disk 1.

It should be noted that the present invention is not necessarily limited to the foregoing embodiments but can be modified in a variety of ways without departing from the gist of the present invention.

What is claimed is:

1. A disk brake comprising:
   a mounting member having a pair of arms spaced apart from each other in a rotational direction of a disk, said arms extending over an outer periphery of said disk in an axial direction of said disk, said arms being provided with pad guides;
   a caliper slidably provided on said mounting member;
   a pair of friction pads slidably mounted on the arms of said mounting member through said pad guides so that said friction pads are pressed against both sides of said disk by said caliper; and
   an entrance-side pad spring attached to one of the arms of the mounting member and an exit-side pad spring attached to the other arm of the mounting member, said entrance-side pad spring and said exit-side pad spring resiliently supporting said friction pads between said arms;
   wherein said entrance-side pad spring includes:
   guide plate portions fitted to the associated pad guides of said mounting member to guide said friction pads axially of said disk in cooperation with said pad guides;
   radially urging portions for urging said friction pads in a radial direction of said disk; and
   circumferentially urging portions formed as wide plate-shaped members which are bent along a bent line portion from said guide plate portions obliquely radially inward of said disk and are supported resiliently by the bent line portion so that the wide plate-shaped members can abut against one side of each of said friction pads and urge said friction pads in the rotational direction of said disk, whereby the wide plate-shaped members constantly urge the other side of each of said friction pads against said exit-side pad spring,
   wherein said entrance-side pad spring further has claw portions that are fitted to the pad guides of said mounting member, together with said guide plate portions, said claw portions being adapted to urge said guide plate portions relative to said pad guides radially outward of said disk by resiliently contacting radially inner wall surfaces of said pad guides as viewed in a radial direction of said disk, and
   wherein said radially urging portions extend axially of said disk between said guide plate portions and said friction pads to urge said friction pads radially outward of said disk, and
   wherein said radially urging portions have projections provided at respective longitudinally intermediate portions thereof, said projections being bent radially inward of said disk, and said guide plate portions have space portions that allow said projections to abut against the radially inner wall surfaces of said pad guides when said radially urging portions are displaced radially inward of said disk so as to approach said guide plate portions.

2. A disk brake according to claim 1, wherein said radially urging portions are elongated plate-shaped members whose proximal ends are folded radially outward of said disk in a substantially U shape and whose distal ends are free ends extending axially of said disk between said guide plate portions and said friction pads, and cuts are formed between said radially urging portions and said guide plate portions, respectively, to allow said circumferentially urging portions and said radially urging portions to be elastically deformed independently of each other.

3. A disk brake comprising:
   a mounting member having a pair of arms spaced apart from each other in a rotational direction of a disk, said arms extending over an outer periphery of said disk in an axial direction of said disk, said arms being provided with pad guides;

a caliper slidably provided on said mounting member;

a pair of friction pads slidably mounted on the arms of said mounting member through said pad guides so that said friction pads are pressed against both sides of said disk by said caliper; and a first pad spring attached to one of the arms of the mounting member and a second pad spring attached to the other arm of the mounting member, said first and second pad springs resiliently supporting said friction pads between said arms;

wherein one of said first and second pad springs has:

guide plate portions fitted to the associated pad guides of said mounting member to guide said friction pads axially of said disk in cooperation with said pad guides;

radially urging portions extending axially of said disk between said guide plate portions and said friction pads to urge said friction pads radially outward of said disk;

claw portions that are fitted to the pad guides of said mounting member, together with said guide plate portions; said claw portions being adapted to urge said guide plate portions relative to said pad guides radially outward of said disk by resiliently contacting radially inner wall surfaces of said pad guides as viewed in a radial direction of said disk;

projections provided at respective longitudinally intermediate portions of said radially urging portions, said projections being bent radially inward of said disk; and space portions provided in said guide plate portions to allow said projections to abut against the radially inner wall surfaces of said pad guides when said radially urging portions are displaced radially inward of said disk so as to approach said guide plate portions.

4. A disk brake according to claim 3, wherein said radially urging portions are elongated plate-shaped members whose proximal ends are folded radially outward of said disk in a substantially U shape and whose distal ends are free ends extending axially of said disk between said guide plate portions and said friction pads, and cuts are formed between said radially urging portions and said guide plate portions, respectively, to allow said circumferentially urging portions and said radially urging portions to be elastically deformed independently of each other.

5. A disk brake according to claim 1, wherein said circumferentially urging portions are sufficiently wide to resiliently abut against said friction pads throughout the service life of said friction pads, from the time when they are new until they have become fully worn.

6. A disk brake according to claim 1, wherein each of said circumferentially urging portions has a bent part in addition to said bent line portion, the bent part being bent in a "<" shape over the entire widthwise length of each of said circumferentially urging portions, the bent part being resiliently abutted against said friction pad.

7. A disk brake according to claim 1, wherein said wide plate-shaped members are spaced apart from each other in the axial direction of said disk.

8. A disk brake according to claim 1, wherein said circumferentially urging portions are configured such that the wide plate-shaped members are arranged substantially parallel to the axis of said disk in a free state before the friction pads are mounted.

9. A disk brake comprising:

a mounting member having a pair of arms spaced apart from each other in a rotational direction of a disk, said arms extending over an outer periphery of said disk in an axial direction of said disk, said arms being provided with pad guides;

a caliper slidably provided on the arms of said mounting member;

a pair of friction pads slidably mounted on the arms of said mounting member through said pad guides so that said friction pads are pressed against both sides of said disk by said caliper; and an entrance-side pad spring attached to one of the arms of the mounting member and an exit-side pad spring attached to the other arm of the mounting member, said entrance-side pad spring and said exit-side pad spring resiliently supporting said friction pads between said arms;

wherein each of said pad springs includes:

guide plate portions fitted to the associated pad guides of said mounting member to guide said friction pads axially of said disk in cooperation with said pad guides; and radially urging portions extending axially of said disk between said guide plate portions and said friction pads to urge said friction pads radially outward of said disk, wherein only said entrance-side pad spring is provided with circumferentially urging portions formed as plate-shaped members extending along the axial direction of the said disk, the plate-shaped members are bent along bent line portions from said guide plate portions obliquely radially inward of said disk and are supported resiliently by the bent line portions so that the plate-shaped members can abut against one side of said friction pads, respectively, and urge said friction pads in the rotational direction of said disk, whereby the plate-shaped members constantly urge the other side of each of said friction pads resiliently against said exit-side pad spring, and wherein said radially urging portions have projections provided at respective longitudinally intermediate portions thereof, said projections being bent radially inward of said disk, and said guide plate portions have space portions that allow said projections to abut against the radially inner wall surfaces of said pad guides when said radially urging portions are displaced radially inward of said disk so as to approach said guide plate portions.

10. A disk brake according to claim 9, wherein each of said circumferentially urging portions are sufficiently wide to resiliently abut against the respective friction pads throughout the service life of said friction pads, from the time when they are new until they have become fully worn.

11. A disk brake according to claim 9, wherein each of said circumferentially urging portions has a bent part in addition to said bent line portion, the bent part being bent in a "<" shape over the entire widthwise length of each of said circumferentially urging portion, with the other bent part being resiliently abutted against said friction pads.

12. A disk brake according to claim 9, wherein said plate-shaped members are spaced apart from each other in the axial direction of said disk.

13. A disk brake according to claim 9, wherein said circumferentially urging portions are configured such that the plate-shaped members extending along the axial direction of said disk are arranged substantially parallel to the axis of said disk in a free state before the friction pads are mounted.

14. A disk brake according to claim 1, wherein said entrance-side pad spring is on an entrance-side of said disc brake, said entrance-side being the side on which the disk enters the disk brake when the disk is rotating in the rotational direction, and wherein said exit-side pad spring is on an exit-side of said disc brake, said exit-side being the side on which the disk exits the disk brake when the disk is rotating in the rotational direction.

15. A disk brake according to claim 9, wherein said entrance-side pad spring is on an entrance-side of said disc brake, said entrance-side being the side on which the disk enters the disk brake when the disk is rotating in the rotational direction, and wherein said exit-side pad spring is on an exit-side of said disc brake, said exit-side being the side on which the disk exits the disk brake when the disk is rotating in the rotational direction.

\* \* \* \* \*